United States Patent
Chew et al.

(10) Patent No.: US 9,141,171 B2
(45) Date of Patent: Sep. 22, 2015

(54) NETWORK ROUTING PROTOCOL POWER SAVING METHOD FOR NETWORK ELEMENTS

(75) Inventors: Yen Hsiang Chew, Georgetown (MY); Radia Perlman, Redmond, WA (US)

(73) Assignee: Intel Corporation, Santa Clara, CA (US)

(*) Notice: Subject to any disclaimer, the term of this patent is extended or adjusted under 35 U.S.C. 154(b) by 82 days.

(21) Appl. No.: 13/977,512

(22) PCT Filed: Jun. 29, 2012

(86) PCT No.: PCT/MY2012/000192
§ 371 (c)(1),
(2), (4) Date: Jun. 28, 2013

(87) PCT Pub. No.: WO2014/003534
PCT Pub. Date: Jan. 3, 2014

(65) Prior Publication Data
US 2014/0192677 A1  Jul. 10, 2014

(51) Int. Cl.
*H04L 12/12* (2006.01)
*G06F 1/32* (2006.01)
(Continued)

(52) U.S. Cl.
CPC ............ *G06F 1/3234* (2013.01); *H04L 12/28* (2013.01); *H04L 41/0833* (2013.01);
(Continued)

(58) Field of Classification Search
CPC ....... H04L 1/0044; H04L 12/28; H04L 41/12; H04L 41/0833; H04L 45/125; H04L 45/48; H04L 43/0882; H04L 29/08315; Y02B 60/33; G06F 1/3237

USPC ........... 370/252, 254; 713/300, 310, 323, 325
See application file for complete search history.

(56) References Cited

U.S. PATENT DOCUMENTS

2003/0123486 A1* 7/2003 Lacey, III ...................... 370/485
2006/0067282 A1   3/2006 Sherman et al.
(Continued)

FOREIGN PATENT DOCUMENTS

WO    2014/003534 A1    1/2014

OTHER PUBLICATIONS

International Search report and Written Opinion received for PCT Patent Application No. PCT/MY2012/000192, mailed on Feb. 15, 2013, 10 pages.
International Preliminary Report on Patentability and Written Opinion received for PCT Patent Application No. PCT/MY2012/000192, mailed on Jan. 8, 2015, 8 pages.

*Primary Examiner* — Charles C Jiang
*Assistant Examiner* — Mohamed Kamara
(74) *Attorney, Agent, or Firm* — Law Office of R. Alan Burnett, P.S

(57) ABSTRACT

Methods and apparatus relating to network routing protocols to support power savings in network elements. A most utilized link path network topology for a computer network is discovered using a routing protocol such as a Spanning Tree, link-state, or distance vector routing protocol. In view of the most utilized link path network topology, links are identified as candidates for power management under which a power state of the link and associated network ports are managed to save power under applicable link conditions, such as low utilization. Link power-state change conditions are detected, and in response a corresponding change to the power state of a link is effected by changing the power-state of the network ports at the ends of the link. Power state changes include putting a link into a reduced power state, taking a link offline, and powering a link back up.

30 Claims, 26 Drawing Sheets

(51) Int. Cl.
  *H04L 29/06*  (2006.01)
  *H04L 12/729*  (2013.01)
  *H04L 12/753*  (2013.01)
  *H04L 12/24*  (2006.01)
  *H04L 12/28*  (2006.01)
(52) U.S. Cl.
  CPC ............. *H04L 41/12* (2013.01); *H04L 45/125* (2013.01); *H04L 45/48* (2013.01); *H04L 69/14* (2013.01); *Y02B 60/33* (2013.01)

(56) References Cited

U.S. PATENT DOCUMENTS

| | | | |
|---|---|---|---|
| 2007/0263554 A1* | 11/2007 | Finn ............................... | 370/256 |
| 2008/0209246 A1* | 8/2008 | Marks et al. ................... | 713/323 |
| 2008/0244282 A1* | 10/2008 | Hansalia et al. ............. | 713/300 |
| 2010/0118881 A1 | 5/2010 | Palmer et al. | |
| 2011/0051734 A1* | 3/2011 | Cardona et al. ............... | 370/400 |
| 2012/0030320 A1 | 2/2012 | Diab et al. | |
| 2012/0113863 A1* | 5/2012 | Vasseur et al. ................ | 370/254 |

* cited by examiner

*Fig. 5*
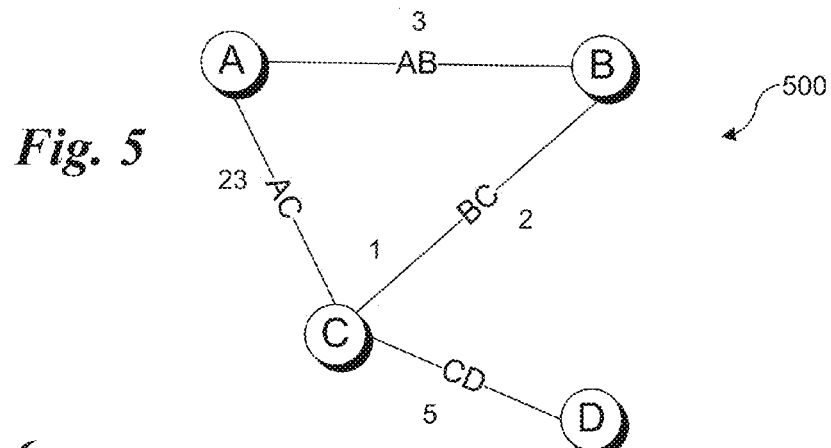
*Fig. 6a*
| from A | via A | via B | via C | via D |
|---|---|---|---|---|
| to A | | | | |
| to B | | 3 | | |
| to C | | | 23 | |
| to D | | | | |
| from B | via A | via B | via C | via D |
|---|---|---|---|---|
| to A | 3 | | | |
| to B | | | | |
| to C | | | 2 | |
| to D | | | | |
| from C | via A | via B | via C | via D |
|---|---|---|---|---|
| to A | 23 | | | |
| to B | | 2 | | |
| to C | | | | |
| to D | | | | 5 |
| from D | via A | via B | via C | via D |
|---|---|---|---|---|
| to A | | | | |
| to B | | | | |
| to C | | | 5 | |
| to D | | | | |
T = 0 (Initial)
| from A | via A | via B | via C | via D |
|---|---|---|---|---|
| to A | | | | |
| to B | | 3 | 25 | |
| to C | | 5 | 23 | |
| to D | | 10 | 28 | |
| from B | via A | via B | via C | via D |
|---|---|---|---|---|
| to A | 3 | | 7 | |
| to B | | | | |
| to C | 8 | | 2 | |
| to D | 31 | | 7 | |
| from C | via A | via B | via C | via D |
|---|---|---|---|---|
| to A | 23 | 5 | | 15 |
| to B | 26 | 2 | | 12 |
| to C | | | | |
| to D | 33 | 9 | | 5 |
| from D | via A | via B | via C | via D |
|---|---|---|---|---|
| to A | | | 10 | |
| to B | | | 7 | |
| to C | | | 5 | |
| to D | | | | |
T = 3 (Final)
*Fig. 6b*

NETWORK ROUTING PROTOCOL POWER SAVING METHOD FOR NETWORK ELEMENTS

FIELD OF THE INVENTION

The field of invention relates generally to computer networks and, more specifically but not exclusively relates to network routing protocols to support power savings in network elements such as switches, routers, and bridges.

BACKGROUND OF THE INVENTION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (i.e., 4G) of mobile network data services is expected to significantly impact the utilization of land-line networks in the near future. The result of these and other considerations is that the utilization of computer networks is expected to continue to grow at a high rate for the foreseeable future.

Typically, computer network deployments are designed to provide sufficient levels of Quality of Service (QoS) during peak workload conditions and/or over sustained periods of operation. These networks are also designed to be highly reliable, typically with built-in redundancies in both equipment and network links. Moreover, modern network routing schemes have inherent built in redundancies, since packets can typically be routed along many different routes between two network endpoints. This is facilitated via the widespread deployment of numerous network elements comprising switches, routers, and bridges that are configured to dynamically route network traffic via high-bandwidth links between the network elements using well-known protocols such as TCP/IP, UDP, RIP, Ethernet, etc.

The result of network deployments designed for peak workload conditions is that networks may have excess capacities during fairly lengthy timeframes. For example, for a given time-zone, utilization of networks may be dramatically lower during late-night and early-morning hours. This provides an opportunity for power savings, by selectively reducing network capacity while maintaining full routing functionality (meaning a packet can still be routed between any two endpoints via the network or subnet).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 shows a simple four node network diagram used for describing an example of determining least cost path routing using a distance vector routing protocol;

FIG. 6a shows initial configurations of distance vector routing matrixes for each of nodes A-D in the network of FIG. 5;

FIG. 6b shows final configurations of distance vector routing matrixes for each of nodes A-D in the network of FIG. 5;

FIG. 8i shows the final form of the most utilized link path routing tree for the network of FIG. 2a;

FIG. 13b is a rear isometric view of the blade server chassis of FIG. 13a;

DETAILED DESCRIPTION OF THE INVENTION

Figure 1:
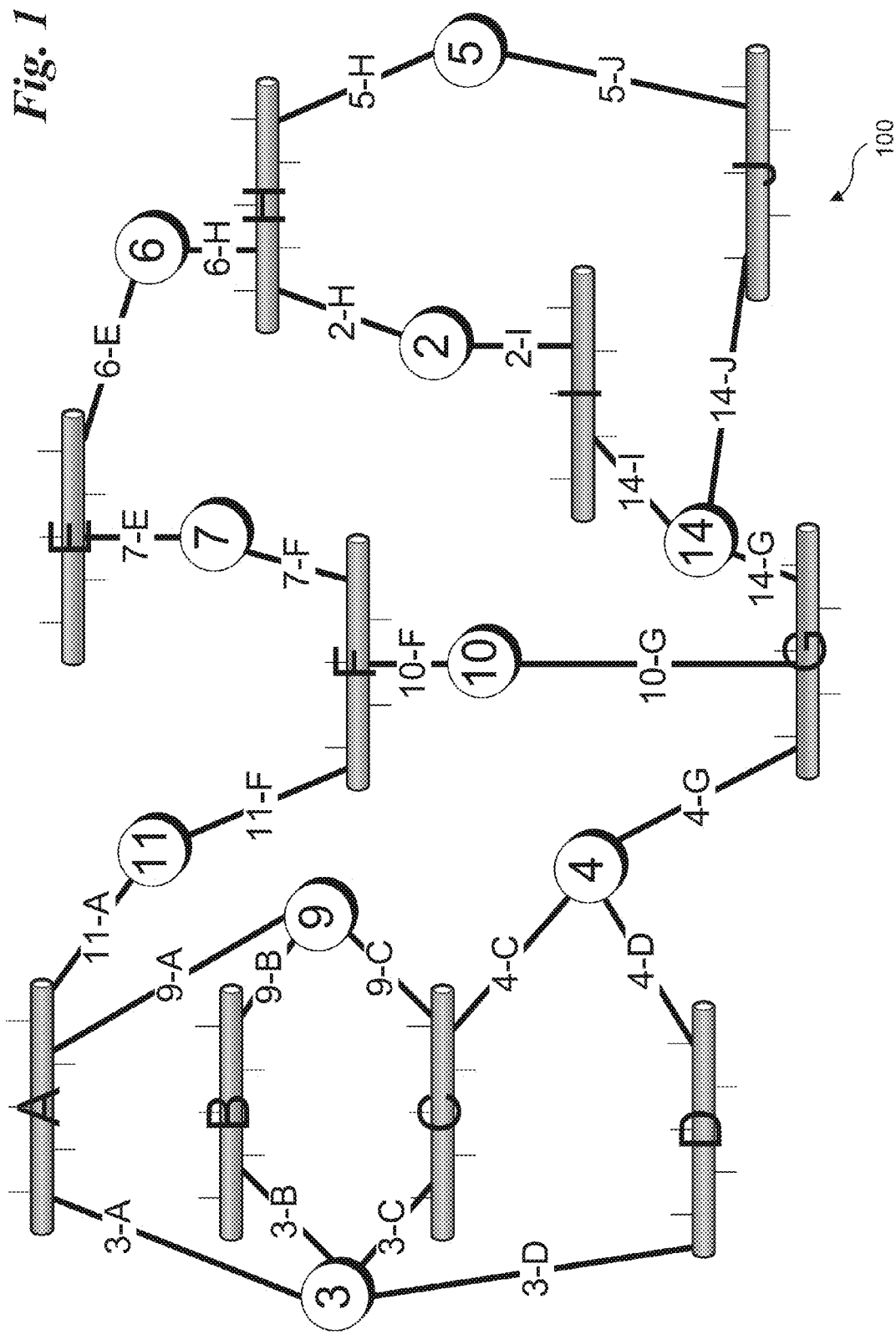
FIG. 1 is a schematic network topology graph illustrating various network nodes and links an exemplary network comprising multiple Ethernet segments coupled via bridges and associated links.

Embodiments of methods and apparatus relating to network routing protocols to support power savings in network elements are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In accordance with aspects of the embodiments disclosed herein, network routing protocols are provided that facilitate power savings in network elements such as switches, routers and bridges. The network routing protocols enable power savings to be obtained through selective reduction of network capacity by reducing the power state of applicable network links and associated ports while maintaining full routing functionality and meeting applicable network performance criteria. The techniques disclosed in the embodiments may be applied to various types of networks and network architectures using corresponding routing protocols. Moreover, the disclosed principles and teachings herein may generally be implemented in both existing and future network architectures.

A first aspect of the protocols is determination of the topology of the applicable network. This typically entails discovering applicable network components including the network elements (typically referred to as nodes), links, network segments, etc., and determining parameters such as routing costs. Once the network topology is known, a determination is made to which links and associated network interfaces (e.g., network ports and/or network interface controllers (NICs)) are suitable candidates for power management. As used herein, link power management generally relates to controlling the link power state through applicable means, such as taking a link offline or reducing a link power state to a low-power idle state, as well as powering up a link to bring it back online. During ongoing network operations, link traffic and related parameters are monitored, and detection of suitable events for changing the link power state of power management candidate links is performed. In response to such events, link power state changes are effected, and network topology information is updated. The foregoing processes may be repeated on an ongoing basis, thus facilitating power savings through dynamic reconfiguration of network topologies in response to applicable opportunities to reduce the power level of applicable links.

In general, the techniques may be applied to substantially any type of network architecture. However, to better understand how the network routing protocols may be implemented, examples pertaining to particular network architectures and structures are described in detail below. These examples are not to be construed as limiting the application of the principles and concepts to only the network architectures depicted in the examples.

Discovery of Network Topology via a Spanning Tree Protocol

In one embodiment, aspects of a Spanning Tree Protocol (STP) are employed for facilitating network topology discovery and determine links that are power management candidates. STP is a network protocol that ensures a loop-free topology for any bridged Ethernet Local Area Network (LAN). Under conventional usage, STP is implemented to prevent bridge loops while concurrently ensuring all LAN or network segment remain accessible via any node in the network. STP also allows a network design to include spare (redundant) links to provide automatic backup paths if an active link fails, without the problem of bridge loops, or the need for manual enabling/disabling of these backup links. The standard implementation of STP is defined in the IEEE standard 802.1D-2004. Selected aspects of the standard implementation are presented herein for clarity and brevity.

To visualize operation of STP, the network topology is depicted as a graph whose nodes are bridges that are coupled to LAN segments using network links having corresponding interfaces (i.e., ports) at each connection. An exemplary graph and corresponding network topology for a network 100 is depicted in FIG. 1. Network 100 includes multiple network segments labeled A-J interconnected via network bridges labeled 2-7, 9-11, and 14 and corresponding network links coupled between the network segments and bridges. For convenience and clarity, each network link is labeled as N-A, where N is the bridge number and A is the network segment. For example, the network links coupling bridge 3 in communication with network segments A, B, C, and D are labeled, 3-A, 3-B, 3-C, and 3-D, respectively. In addition the bridge ID's for the following discussion are simply the node number for each bridge node, and the terms bridge and node may be used interchangeable in the following description.

To break loops in the LAN while maintaining access to all LAN segments, the bridges collectively compute a spanning tree. The spanning tree that the bridges compute using the Spanning Tree Protocol can be determined using the following rules and operations.

First, a root bridge of the spanning tree is selected. The root bridge of the spanning tree is the bridge with the smallest (lowest) bridge ID. Each bridge has a unique identifier (ID) and a configurable priority number; the bridge ID contains both numbers, wherein the priority number is used to determine the smallest bridge ID, and the unique ID is used for a tie-breaker in situations where two or more bridges share the same priority number. For example, to compare two bridge IDs, the priority is compared first. If two bridges have equal priority, then the MAC addresses, which are guaranteed to be unique (and thus employed as the unique IDs), are compared, with the lower MAC address breaking the tie. Since a priority for each bridge is configurable, a network administrator can select which bridge is to be the root bridge by setting that bridge to have a lower priority number than all of the other bridges. For networks in which a root bridge is unknown, the root bridge can be automatically determined using the following operations.

Figure 1A:
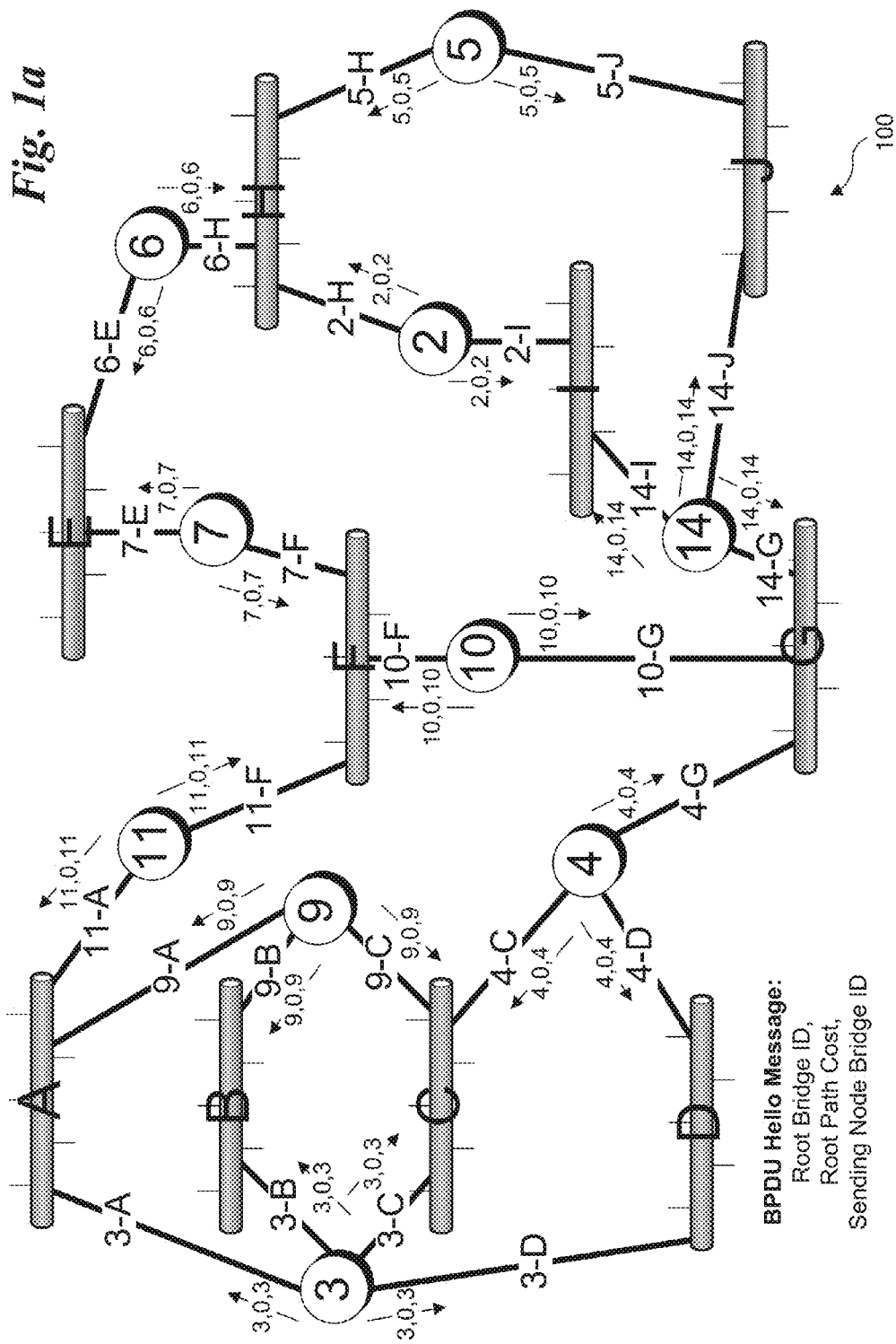
FIGS. 1a-1e collective illustrate implementation of a Spanning Tree Protocol to determine the root ports and designated ports for the network in FIG. 1.

With reference to FIG. 1a, each bridge node sends out a hello message along each of its links to its neighboring nodes, enabling the neighboring nodes to exchange configuration information. Under STP, the hello messages comprise special data frames called Bridge Protocol Data Units (BPDUs) that are used to exchange information about the bridge IDs and root path costs. A bridge sends a BPDU frame using the unique MAC address of the port itself as a source address, and a destination address of the STP multicast address 01:80:C2:00:00:00.

As discussed above, the bridge ID is a combination of the bridge priority number and its MAC address, However, for illustrative purposes and clarity of explanation, the bridge ID for each node depicted in FIGS. 1 and 1a-1e herein is simply the unique single- or two-digit number for the node.

The BPDU frame (referred to herein as a BPDU hello message) contains a tuple comprising a Root Bridge ID, Root Path Cost, and the Sending node's Bridge ID. The Root Bridge ID is the bridge node ID corresponding to the ID of the node the sending bridge node thinks is the correct Root Bridge for the current message exchange cycle, which is referred to herein as the candidate Root Bridge, since the correct Root Bridge would not be known to all bridges at this stage. The Root Path Cost is the protected cost of sending a packet along a path from the Sender to the candidate Root Bridge. For the following example, the cost from traversal of a given bridge node to a neighbor node is '1', while the cost for traversing a link or crossing a bridge is '0'. As described below, in an actual implementation there may be a particular cost assigned to each network segment, with optional costs associated with links and/or the bridge nodes. In addition to being assigned, costs for links, bridges, and network segments may be dynamically determined, e.g., by measuring link traffic and related parameters during network operation.

The automatic root bridge discovery process begins with each bridge node exchanging BPDU hello messages with each of its neighbor nodes. Initially, each bridge node considers itself the root bridge candidate, and thus sends out BPDU hello messages having a tuple of (Node's own Bridge ID, 0, Node's own Bridge ID). This is illustrated in FIG. 1a, where each node sends out a BPDU hello message advertising itself as the root bridge. For example, bridge node 2 sends out a tuple of {2,0,2} to each of its neighboring nodes, 6, 5, and 14, bridge node 3 sends out a tuple of {3,0,3} to each of its neighboring nodes 11, 9, and 4, etc.

In response to receiving a BPDU hello message, each recipient node compares its current Root Bridge ID with the Root Bridge ID in the message. If the Root Bridge ID is lower, then the recipient node updates its Root Bridge ID to the Root Bridge ID in the received message, along with updating its Root Path Cost to that node. The third value of the tuple, the sending node's Bridge ID, is always the same for messages sent from a given node.

Figure 1B:
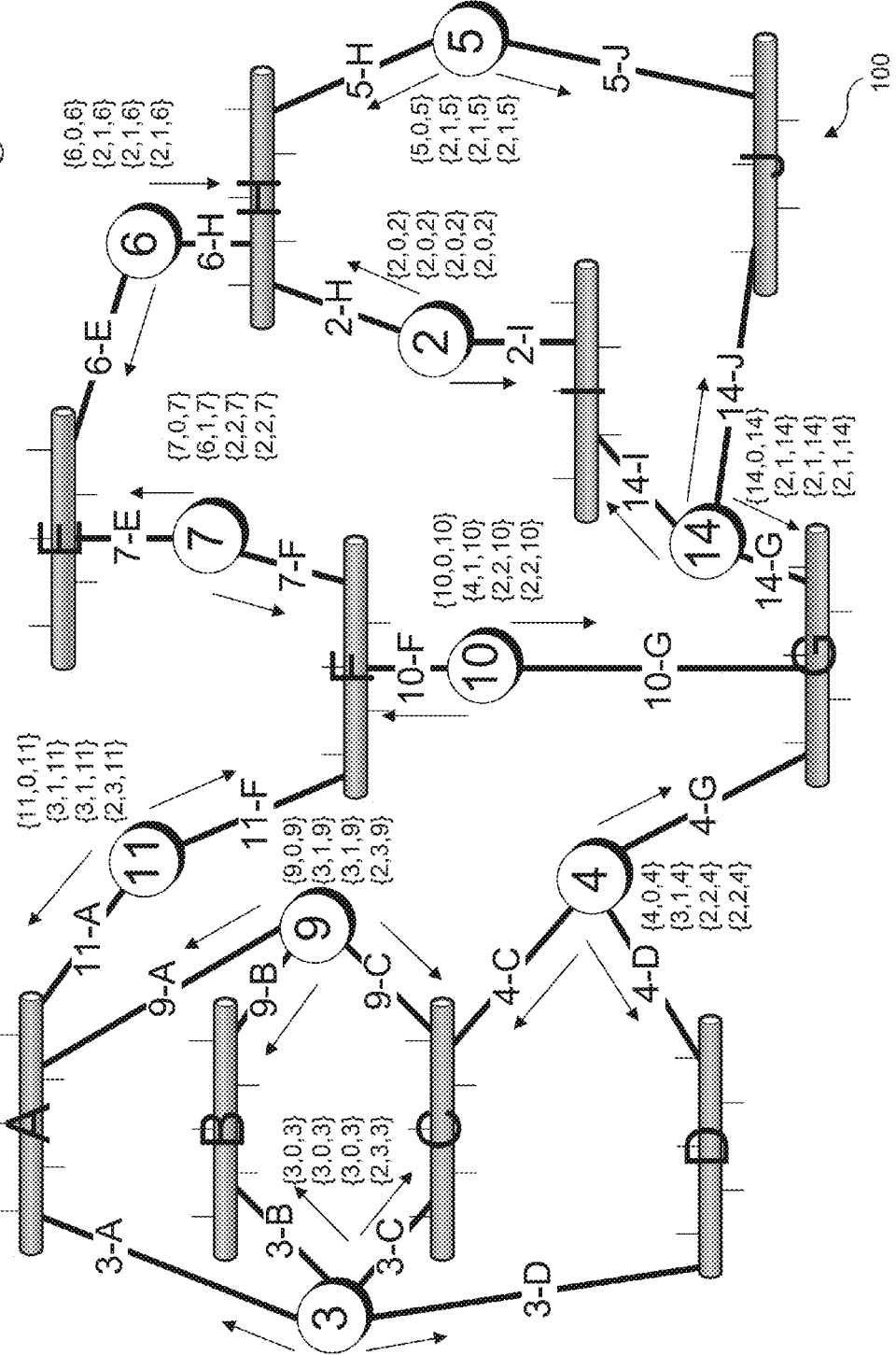

During the network topology discovery process, BPDU hello messages are exchanged between pairs of nodes, with each node updating its subsequent message based on any applicable change to its Root Bridge ID and Root Path Cost values. For simplicity and clarity, FIG. 1b illustrates the tuple values for BPDU hello messages for each of four exchange cycles, where under an exchange cycle the tuple values for a subsequent message are updated in view of message received from all of a given node's neighbor nodes. Under one embodiment in accordance with IEEE standard 802.1D-2004, BPDU hello messages are sent every two seconds. However, other embodiments may employ other time periods between messages.

Figure 1C:
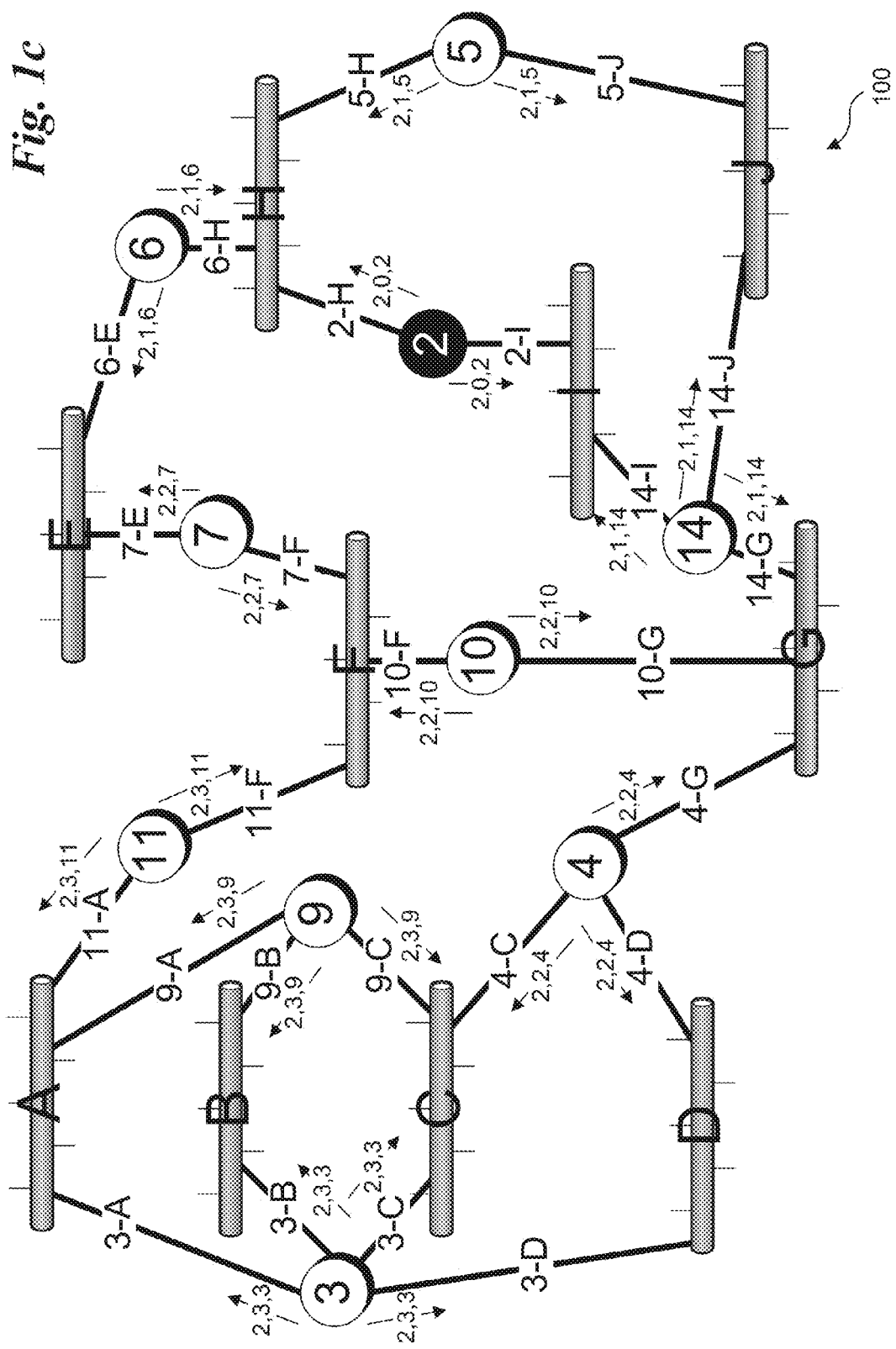
Figure 1D:
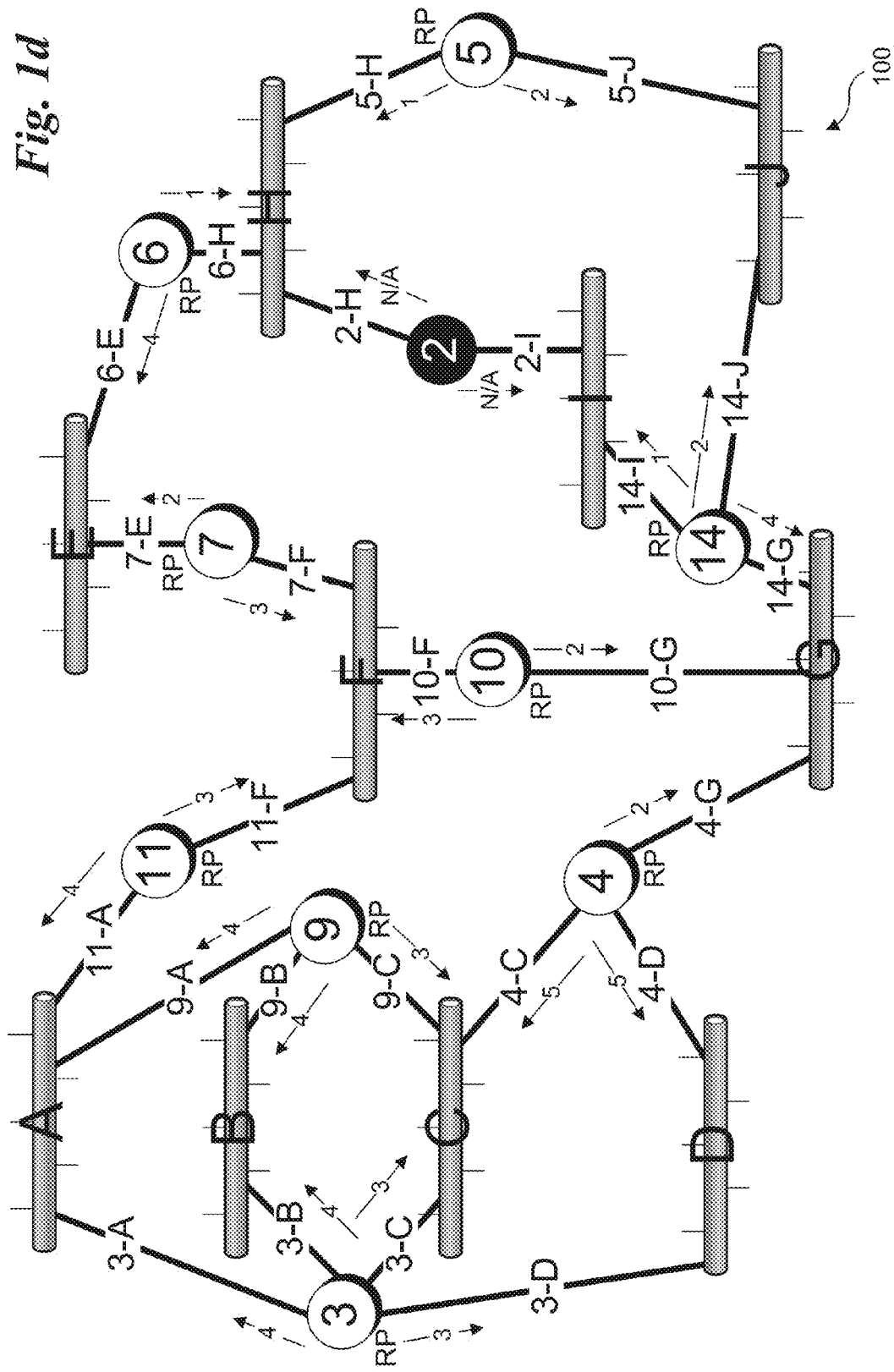
Figure 1E:
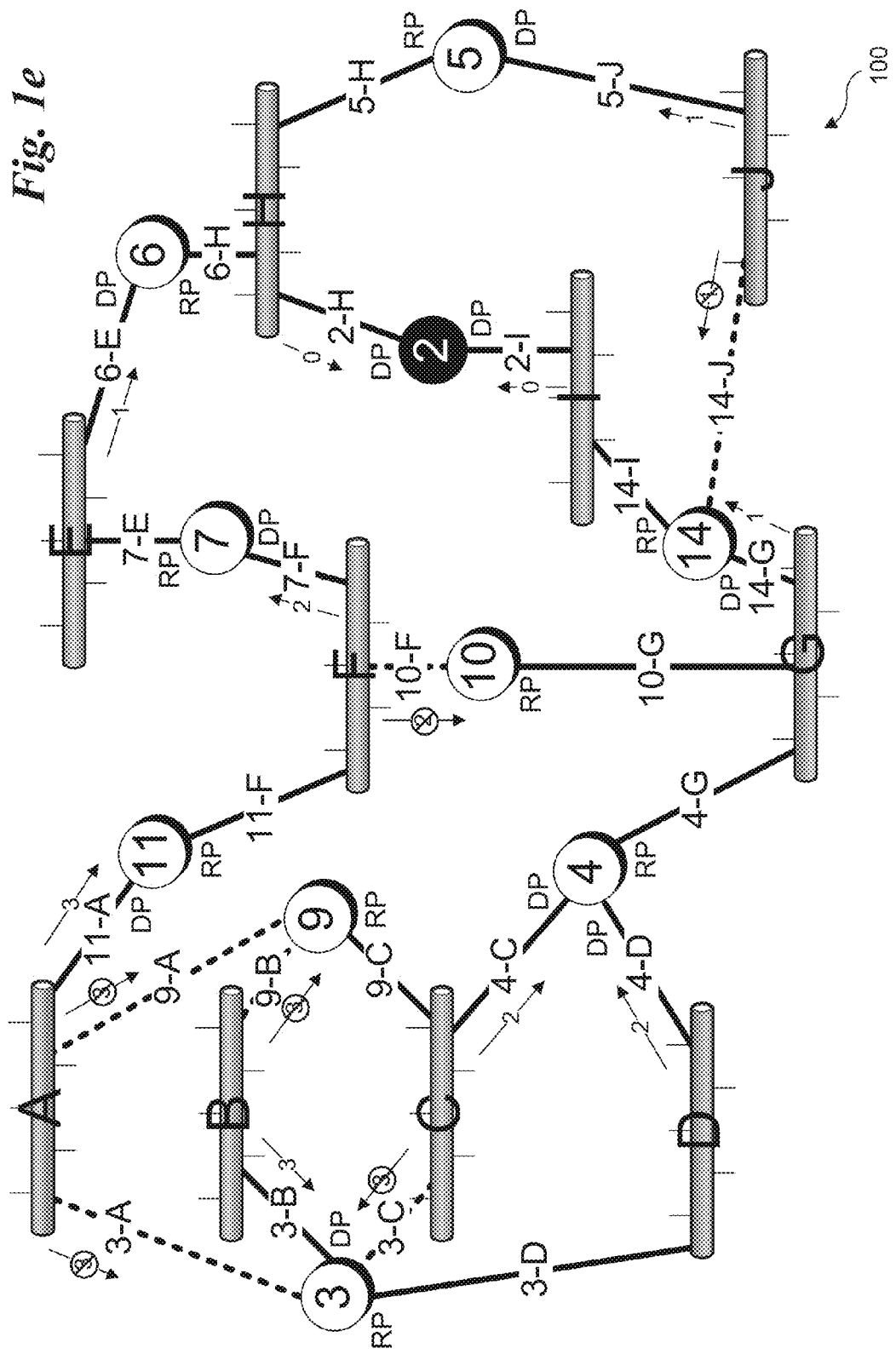

In this example, the Root Bridge (node) ID is 2, as depicted by the darkened circle for node 2 in the graph for network 100 of FIGS. 1c-1e as depicted herein. The identity of the Root Bridge ID could immediately be recognized by looking at the graph; however, each node in the graph is only aware of information it receives from its neighbor nodes, so the nodes are unaware of the entire network topology, and thus determine the Root Bridge through the discovery process facilitated by STP.

Since 2 is the Root Bridge ID, the values in node 2's tuples will not change as long as it remains the Root Bridge. As illustrated in FIG. 1b, the tuple is initially {2,0,2} and does not change. Conversely, the tuple values in the messages for all of the other nodes will change at least once during the discovery process.

For example, consider node 6. During the first cycle it receives the following tuples: {2,0,2} from node 2, {5,0,5} from node 5, and {7,0,7} from node 7. A comparison of theses tuple values with its own {6,0,6} tuple will result in node 6 recognizing that node 2 is a better Root Bridge candidate, since it has a lower Root Bridge ID in its BPDU hello message. Given this result, node 6 updates its first tuple value to 2 (node 2's Bridge ID), and then calculates the cost of the path to node 2, which is a value of 1 since there is one network segment (H) between candidate Root Bridge node 2 and node 6. During the next message exchange cycle, node 6 sends out a BPDU hello message with a tuple of {2,1,6}. The comparison results of BPDU hello message during subsequent cycles do not result in a change in the candidate Root Bridge ID (i.e., node 2), which likewise means the Root Path Cost to node 2 is not changed. As a result, the tuples sent from node 6 during message exchange cycles 3 and 4 are also {2,1,6}.

During each message exchange cycle, the correct Root Bridge ID (that is, the Root Bridge ID of the node that will end up being the Root Bridge) gets propagated outward another hop. As a result, the number of cycles it takes for all of the nodes to identify the correct Root Bridge ID is equal to the minimum number of hops needed to reach all nodes from that node.

As is observed, the values in the sets of tuples for each node reflect the relative proximity of a node to other nodes with lower Bridge IDs. For example, consider nodes 3, 9, and 11. During the second massage exchange cycle, each of nodes 9 and 11 has identified that node 3 is a better Root Bridge candidate than they are, and thus update their tuples to reflect node 3 as the Root Bridge candidate. This same tuple is sent out for cycles two and three for each of nodes 9 and 11, while node 3 sends out the same tuple for the first three cycles. However, during the fourth cycle, the Bridge ID value for node 2 has reached each of nodes 3, 9, and 11, and as a result, each of these nodes has updated its tuple to reflect node 2 as the best candidate Root Bridge Node ID.

Once the BPDU hello message for a node becomes steady state (with respect to the Root Badge ID, since in some embodiments link costs values (and thus Root Path Costs) will be determined based on real-time link conditions), then the bridge having that Bridge ID operates as the Root Bridge for the network. In the illustrated example shown in FIGS. 1c-e, it is presumed that the candidate Roof Bridge ID values in subsequent message tuples do not change, such that the Root Bridge ID value in each tuple from a given node is the same. Moreover, in this example, since the costs for each segment is set at 1, the Root Path Cost values will also stay the same, resulting in the same tuple being sent from each node once the Root Bridge ID is determined. As a result, node 2 becomes the operative Root Bridge for network 100.

Since BPDU messages are periodically sent throughout during network operation, and node priorities may be changed (e.g., by a network administrator), it is possible for the Root Bridge to change. For example, another node could be given a lower priority than a current Root Bridge, or a port in a Root Bridge could fail. In response, the network bridge nodes will automatically determine an appropriate new Root Bridge.

The next phase in the process is to determine the root port (RP) for each bridge. First, each bridge calculates the least cost path (LCP) from itself to the Root Bridge node. The results are depicted in FIG. 1d, wherein the numbered arrows emanating from each node represents the least cost path to the Root Bridge node in the direction of each arrow. Based on these determinations, the port through which the lowest cost path would be taken is identified as the Root Port for the bridge. The Root Ports for the bridges in FIG. 1d are identified by labels "RP" adjacent to the Root Port for each bridge. (In the Figures herein, bridge ports are depicted by the junction between a network link and a node circle.)

A similar operation is performed for the network segments, under which the least cost path from each network segment to the Root Bridge is determined. For a given network segment, the bridges linked to the segment determine which bridge has the least cost path to the Root Bridge. The bridge port at which the segment is connected to the bridge having the least cost path is then referred to as the designated port (DP). The DP's and root path costs for each route from the network segments are depicted in FIG. 1e.

At this point the RP's and DP's for the network bridges are identified. In accordance with some embodiments employing STP, the bridge ports that are neither a root port nor a designated port become candidates for link-state power management. These ports are identified in FIG. 1e by arrows having root path cost numbers with circles having a slash through them, wherein the arrow points to the port being a candidate for power management. The dashed lines used for links in FIG. 1e depict those links as being power management candidate links.

Under the original STP implementation developed by Radia Perlman, co-inventor of the present application, the ports coupled to the end of these links would be blocked to prevent bridge loops for Ethernet networks employing layer 2 routing. Although developed for Ethernet, STP may be also used for other types of networks (e.g., networks employing routers and/or switches).

For larger-scale networks employing packet-switching architectures, other types of routing protocol are typically used, as now follows.

Discovery of Network Topology via a Link-State Routing Protocol

The link-state routing protocol is one of the two main classes of routing protocols used for packet-switching networks (the other being the distance-vector routing protocol, described below). The link-state routing protocol is performed by every switching node in the network (i.e. nodes that are prepared to forward packets; these are typically referred to as switches or routers). The basic concept of link-state routing is that every node constructs a map of the connectivity to the network, in the form of a graph, showing which nodes are connected to which other nodes. Each node then independently calculates the best logical path from it to every possible destination in the network. The collection of best paths will then form the node's routing table.

Figure 2:
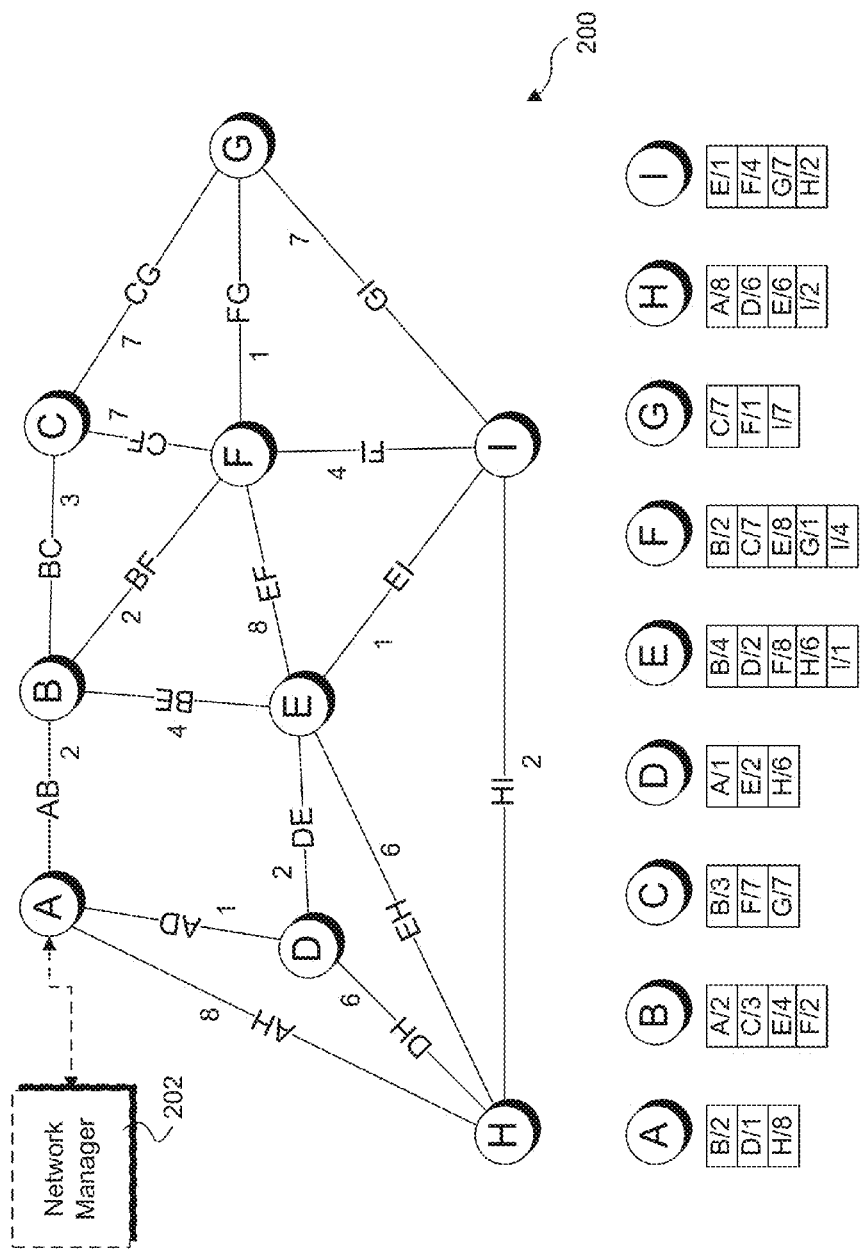
FIG. 2 is a combination network topology and link-state diagram illustrating an exemplary network link topology and corresponding link states for the network nodes.

FIG. 2 shows an exemplary network 200 suitable for implementing the link-state routing protocol. Network 200 includes a plurality of nodes labeled using letters A-I, interconnected via corresponding links labeled using the corresponding letters of its two interconnected nodes (e.g. AB of FIG. 2), wherein the lower letters identify the two nodes connected by each link with the lower letter in the alphabet first. The numbers adjacent to each link represent the cost of that link. For example, the cost for link AB is 2, while the cost for link AH is 8. For convenience simple integer values are used for link costs in this example; one of skill in the art will recognize that link costs would typically comprise larger numbers having a wider range.

Figure 3:
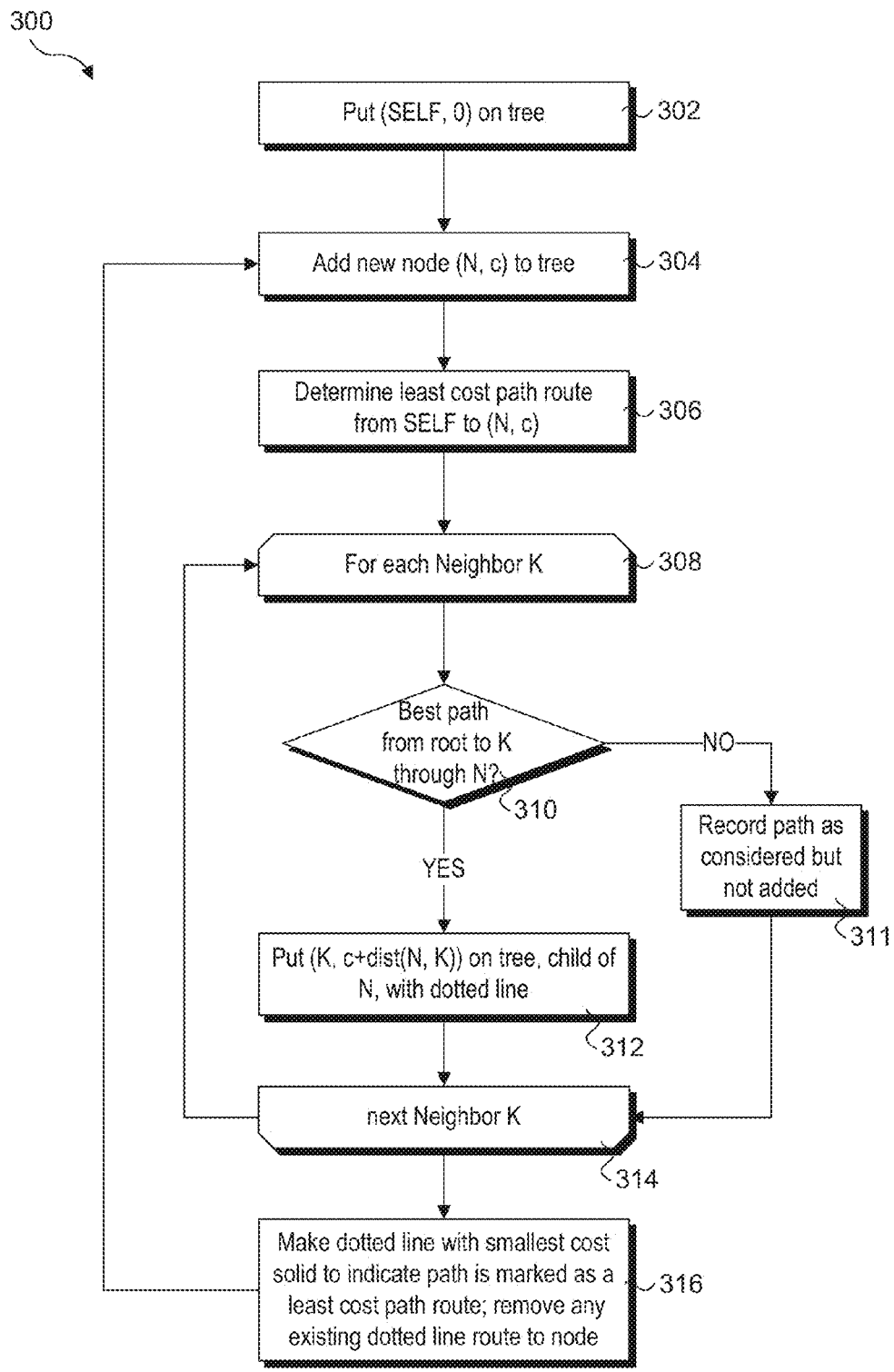
FIG. 3 is a flowchart illustrating operations and logic for generating a least cost path routing tree using a link-state routing protocol.

Under the link-state routing protocol, the network topology is determined collectively by the nodes, with each node determining the best routes from itself to other network nodes. Typically, this is determined using a variant of Dijkstra's algorithm, which produces a routing tree structure for each node, as determined by that node. A flowchart corresponding to one variant employing a Greedy algorithm is shown in FIG. 3, while corresponding representations of a routing tree are depicted in FIGS. 4a-4i.

With reference to a block 302, the algorithm begins at the node for which the tree is being constructed, referred to as SELF. That node, with a cost c of 0 is added as the root node for the tree. In the routing tree examples illustrated in FIGS. 4a-4i, node A is the root node.

Next, in a block 304, a new node (N, c) is added to the tree, where N identifies the node (in this example N will comprise letters corresponding to nodes A-I), and c is the cost of the link from the new node to the current node to which the new node is added.

In a block 306, the least cost path from the cement node (beginning with SELF) to the new node (N, c) is determined. Following this, a set of operations is performed for each Neighbor node K, as depicted by start and end loop blocks 308 and 314. First, a determination is made to whether the best path from the root node to K is through the new node N. If the best path to K is through N, then, in a block 312, a new node corresponding to node K is added to the tree, with a distance of c+dist(N, K). The new node is added as a child of N, and depicted as a dotted line between N and K. The logic then loops back to block 308 to evaluate the next Neighbor node, which becomes the new node K. If the best path to K is not through N, the logic flows to a block 311 in which a record is made that the path has been considered but is not added to the tree (as a dashed line) and loops back to block 308 to evaluate the next Neighbor node K.

After each Neighbor node has been considered, a determination is made to which of the added tree segments (i.e., links between the added Neighbor nodes K and the current node N) have the lowest cost. The line corresponding to this tree segment is then made into a solid line. If an existing dotted line to the node exists, that path is marked as removed. The logic then loops back to block 304 to add another new node to the three, and the foregoing operations are repeated. This is continued on until the full least cost path routing tree for the root node is determined.

Figure 4A:
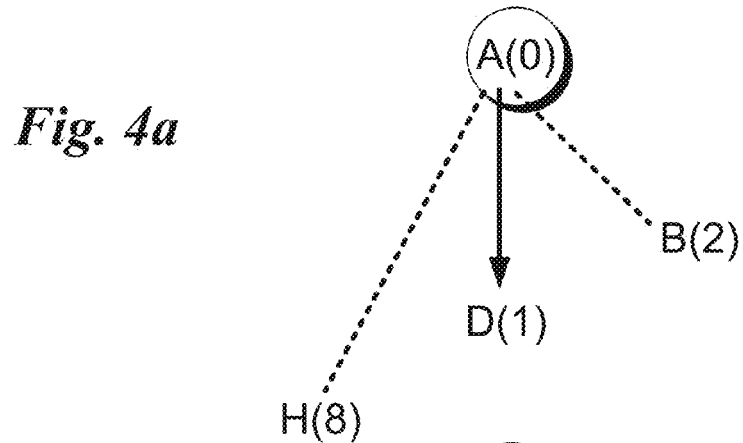
FIGS. 4a-4i illustrate generation of a least cost path routing tree for node A of the network shown in FIG. 2 using a link-state routing algorithm.

FIGS. 4a-i illustrates the building of a least cost routing path tree for node A. The start of the process is depicted in FIG. 4a, which shows a portion of a routing tree for node A after one iteration of the operations in the outer loop of flowchart 300 have been performed. First, node A is depicted by putting A(0) at the top of the tree, which makes it the root node. (It is also the current or new node being processed, which is indicated in the Figures herein by a circle with a shadow, while circles without shadows are used to indicate a node has been previously evaluated.) Next, since the best routes from each of A's neighbor nodes (i.e., H, D, and B) will be the shortest path to A (as determined at this point), tree segments from node A to each of nodes H, D, and B would be drawn as dotted lines, and the added neighbor nodes would be depicted as the node identifier (N), with the cost c from that node to the root node (A) in parenthesis. The tree segment corresponding to the link with the path with the lowest cost, which is from node A to node D, is then changed from a dotted line to a solid line in accordance with block 316, with the final result shown in FIG. 4a. Visualization of the routing path tree creation process is enhanced in the Figures herein with the use of an arrow at the end of a new least cost routing path that is added during the flowchart iteration corresponding to each of FIGS. 4a-i. The arrow also identifies the new node N for the following iteration.

At this point, the node at the end of the most recently added solid path becomes the new node N, and the process is repeated relative to this new node. Continuing at FIG. 4*b*, the new node is D, which has neighbors H and E. As shown, two new dashed lines have been added from node D to nodes H and E, with respective routing path costs from each of the added nodes to the root node A. The routing path cost values are the sum of the cost to node D (i.e., 1) plus the cost along the path between node D and nodes H and E, which results in routing path costs of 1+6 and 1+2 respectively.

Figure 4B:
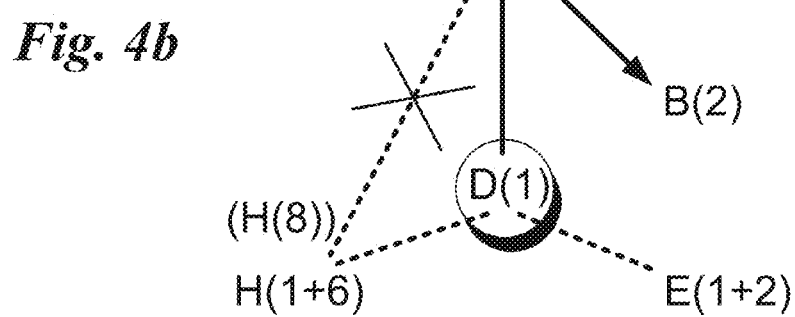

FIG. 4*b* further shows the removal of the path from node A to node H. The reason for this is the cost of the path from node A to node H through node D is less than the path directly from node A to node H. As a result, there will never be a situation where a least cost path from node A to node H will include link AH, and so this link is not part of node A's least cost path routing tree. For illustrative purposes, removed links are left in the Figures depicting the results of subsequent iterations to indicate that once a path has been removed, the reverse route for the path need not be considered when a node at the beginning of the reverse route is evaluated. For example, when node H becomes the new node N in FIG. 4*i*, it will not consider adding path AH to the routing tree for A. This will become clearer as the routing tree is created. In one embodiment, the least cost routing path algorithm keeps track of each removed path such that removed path are not considered during subsequent iterations once removed.

Figure 4C:
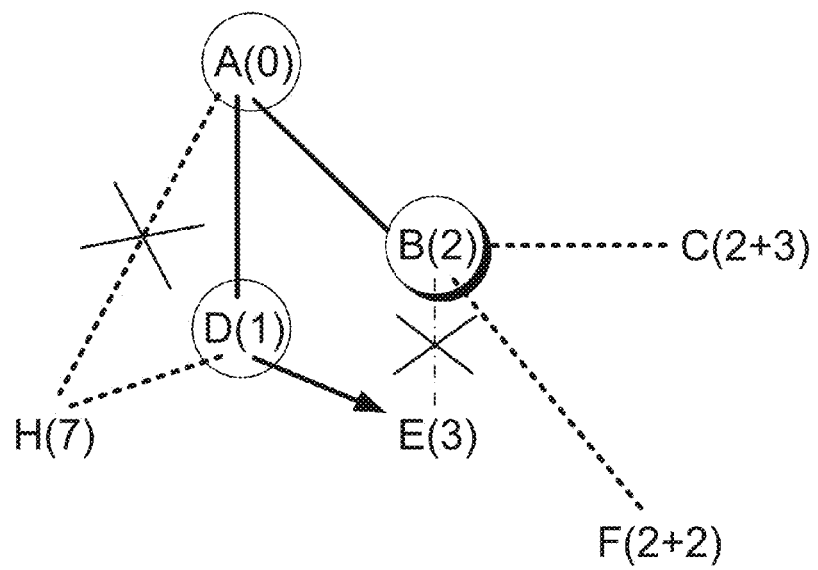

Continuing at FIG. 4*c*, the next node at which new paths are added is node B, since this node marked the end of a path with the least cost path to the root node A. Three new paths are added from node B to nodes C, E, and F, along with the route path cost to node A through node B. Since the route to node E to the root node A through node B is not the least cost path, the path from node B to E is not added to the tree, in accordance with the logic in decision block 310 and operation of block 311. However, for illustrative purposes, this path is depicted as a centerline with an X through it indicating this path has been considered but was not added. In a manner similar to removed paths, considered paths that are not added are left in the Figures for subsequent iterations to indicate these paths are not further considered. In one embodiment, the least cost routing path algorithm keeps track of each considered path that is not added so that such paths are not considered during subsequent iterations.

FIG. 4*c* also depicts a situation where none of the added paths connect a new node that has a lower routing cost path to root node A than an existing node. For example, the least cost path from node C to A through B is 5, while the least cost path from node F to A through b is 4. Both of these are greater than the least cost path from node E to root node A, so node E becomes the next new node N, and the path from D to E is added to the least cost path routing tree for node A.

Figure 4D:
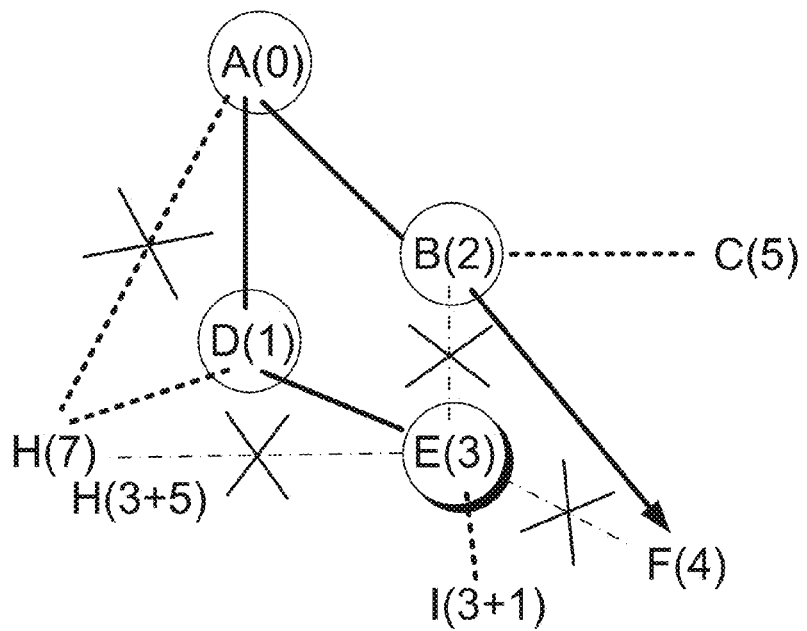

As shown in FIG. 4*d*, three new paths are added from node E to nodes H, I and F. As further shown, the cost of the route path from node A to node H through node E along path EH is greater than the route path from node A to D to H. As a result, the path EH has been considered, but is not added to the tree. Similarly, the path from node E to node F does not result in a lower cost routing path to root node A that already exists, so path EF is also depicted as being considered but not added.

Figure 4E:
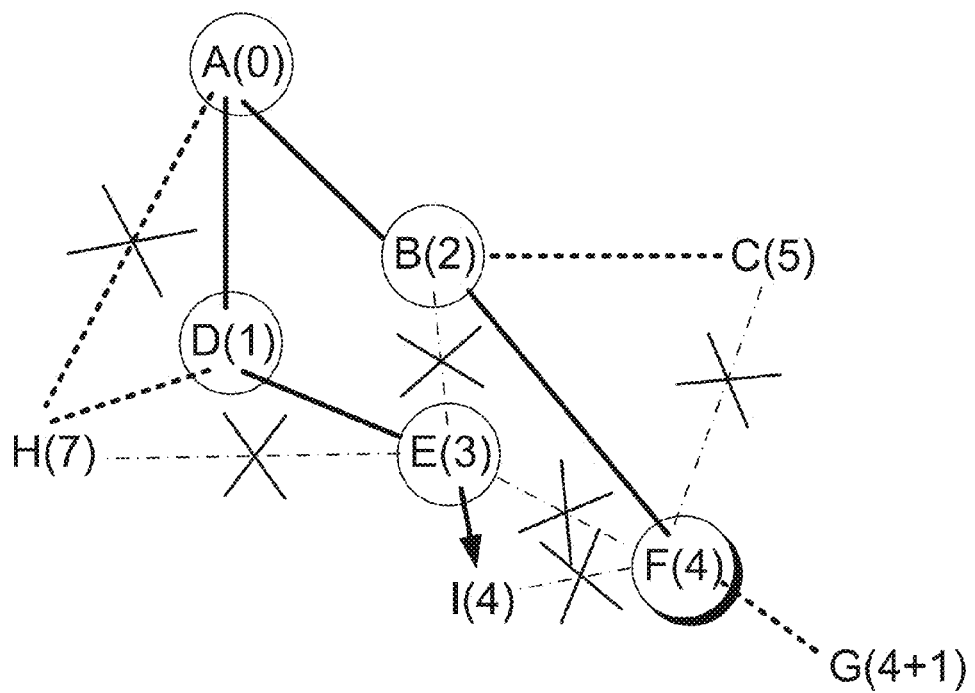

At the point, the next least cost path to the root node A is from either node F or node I (both 4). Using the lower alphabet letter as a tie breaker, node F is considered the new node N and paths are considered and drawn (as applicable) from node F it to its neighbor nodes C, I and G, as shown in FIG. 4*e*. A new path from node F to node G is added, while paths from node F to node C and from node F to node I are depicted as being considered but not added. Since an existing path to node A (the least cost path from node I) has a lower cost than the new path to node G, path FG is left as a dotted line and path EI is added to the least cost path routing tree.

Figure 4F:
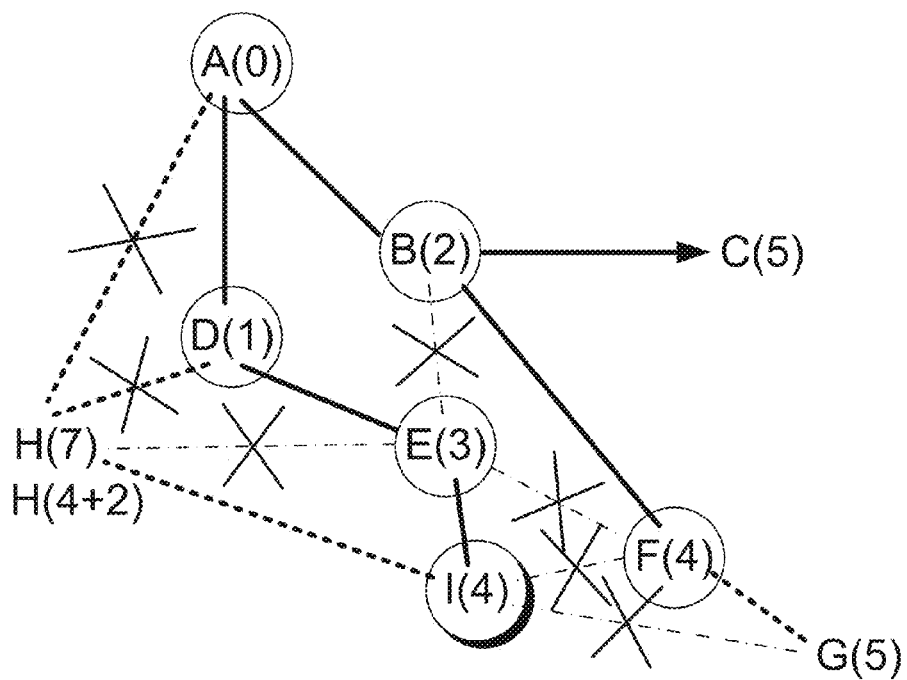

As shown in FIG. 4*f*, node I is the next node that is added as new node N. New paths are drawn from node I to nodes G and H, resulting in a new lowest cost path node H, since the cost of the route from node A to node H along the path A-D-E-I-H (6) is less than the existing cost for path A-D-H (7). Accordingly, the path from node D to node H is marked as removed. Since a path between nodes I and F has already been considered and not added, this path is not reconsidered. A path from node I to node G is also considered but not added, since the existing least cost routing path to node G is lower. At this point nodes C and G have the least cost path to node A (both 5), and node C wins the tie breaker, resulting in the path from node B to node C made into a solid line and node C becomes the new node N.

Figure 4G:
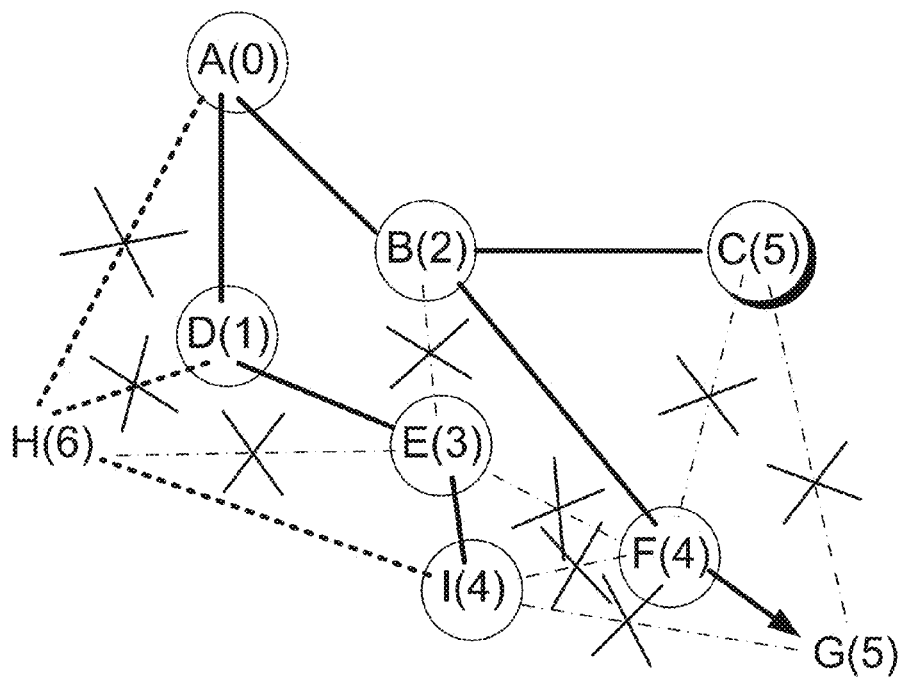

Continuing at FIG. 4*g*, employing node C as new node N results in consideration but not adding paths from node C to node G. The remaining (to be evaluated) node with the least cost routing path to root node A is node G using the path A-B-F-G. Accordingly, the path FG is made solid, and node G becomes the new node N.

Figure 4H:
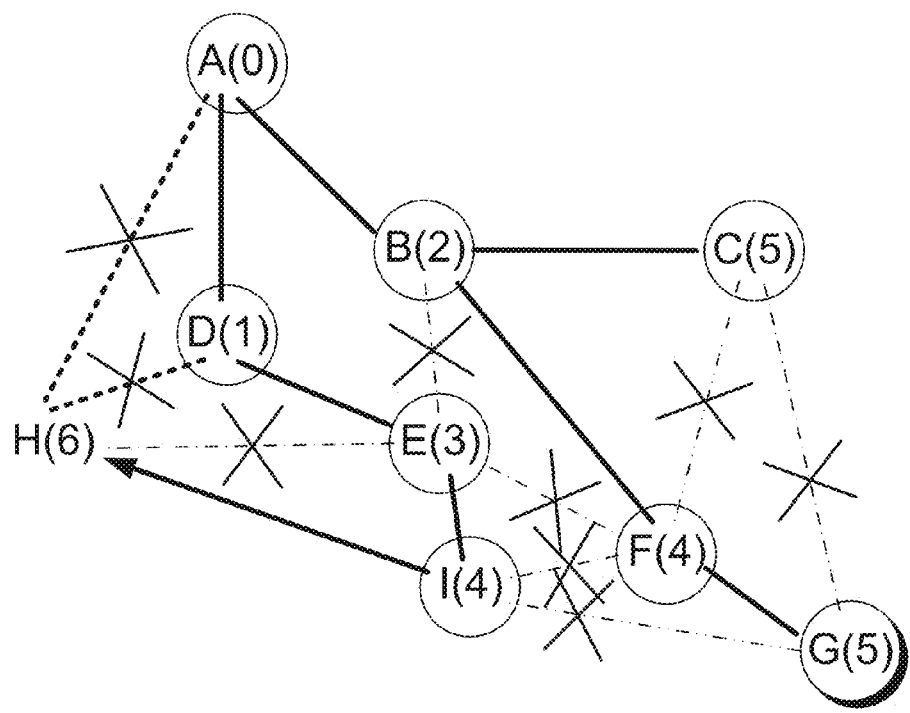
Figure 4I:
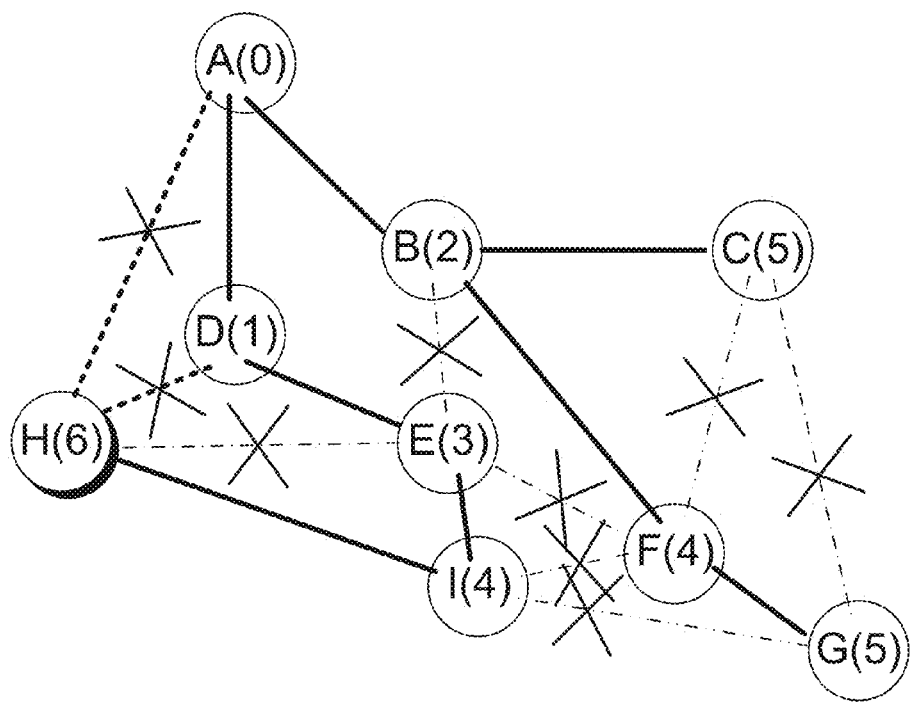
Figure 4J:
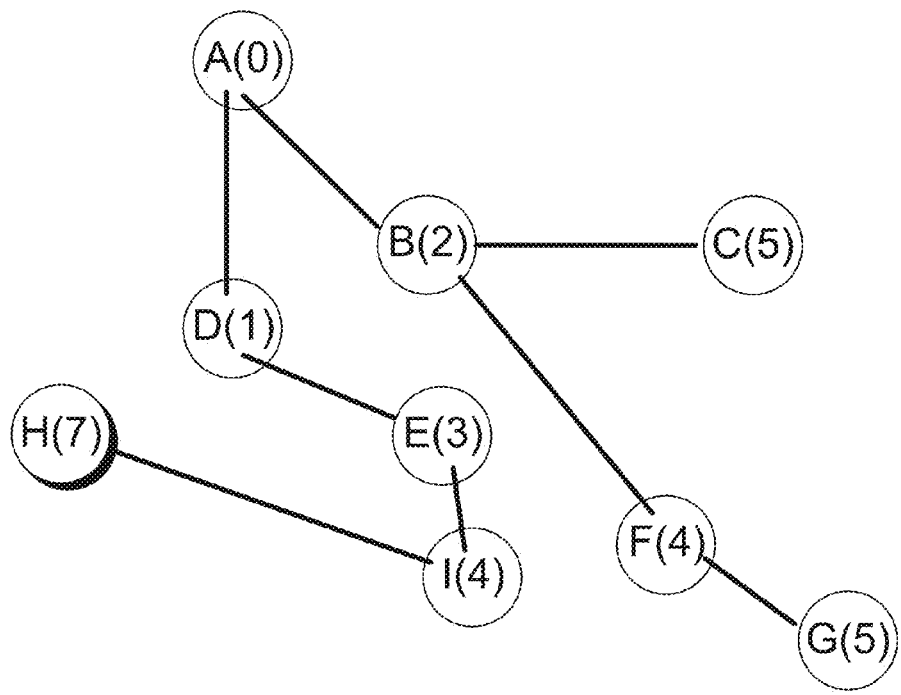
FIG. 4j shows the final form of least cost path rooting tree for node A.
Figure 4K:
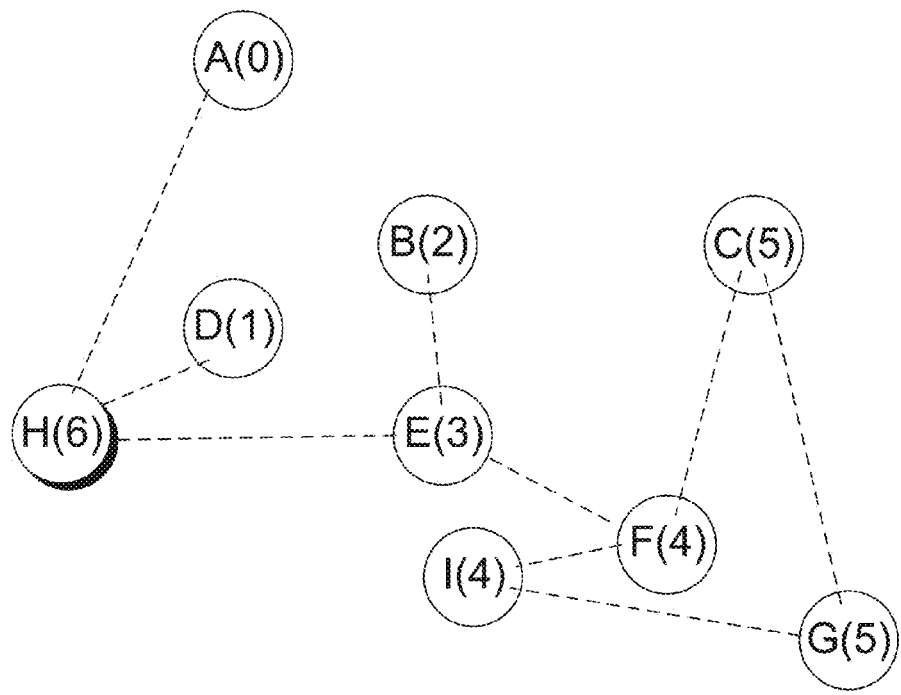
FIG. 4k shows the links in the routing tree for node A comprising non-least cost paths.

As shown in FIG. 4*h*, since all of the paths from node G have been previously considered, there are no changes in the depiction of the paths from node G, and evaluation of node G is completed. Since node H is the only remaining node, the least segment (path HI) for its least cost path A-D-E-I-H is made solid, with the final least cost routing path tree for node A shown in FIG. 4*i* (with considered paths that are not part of the final tree) and FIG. 4*j* (just showing the least cost routing path tree. FIG. 4*k* shows only the links (paths) between nodes that are not part of the least cost routing path tree for node A.

Figure 2A:
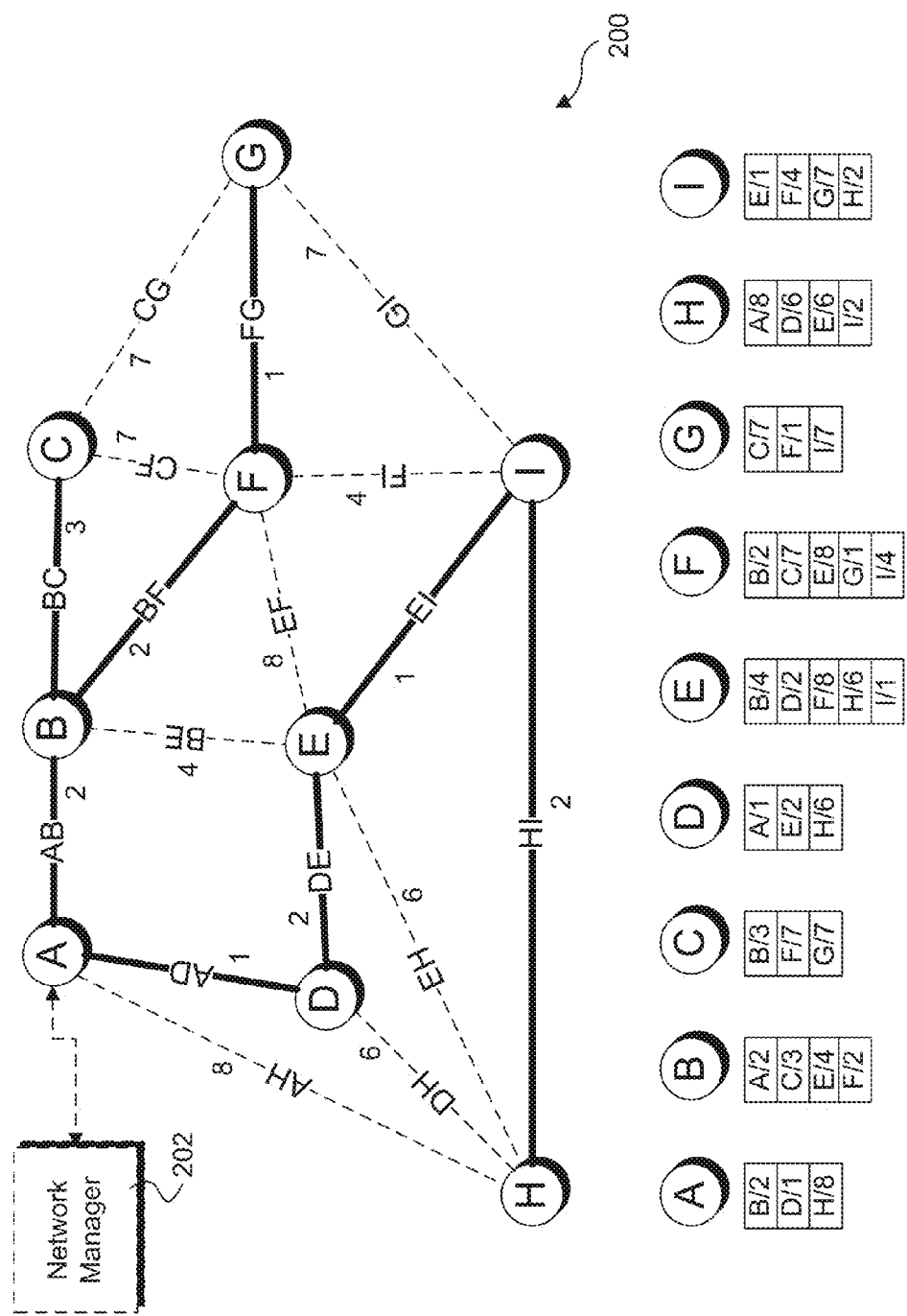
FIG. 2a shows the network topology of FIG. 2 in which least cost routing paths are shown as bold solid lines and non-least cost routing paths are shown as dashed lines.

A similar process is performed by each node to determine its own least cost routing path tree. A union of the paths in the least cost routing path trees for all of the nodes forms the least cost routing path tree for the entire network. For network 200, this result is shown in FIG. 2*a*, wherein the least cost routing path links are shown in broad solid lines, while links that are not used by the least cost path routing trees for any nodes are shown a thin dashed lines. It is noted that the link paths depicted with thin dashed lines also comprises the intersection of the considered but not added paths and the removed paths for all of the nodes.

Examining FIG. 2*a* in further detail, the links corresponding to routing path segments depicted in this dashed lines represent the links that are candidates for power management, according to one embodiment. Since these links represent paths that are not among the path segments for the least cost routing path tree of any node, taking one or more of these links offline or putting it in an idle or low power state will have a lower impact on the routing performance of network 200 when compared with taking one of the least cost routing paths segments down.

A power management routing protocol for a network for which routing paths are determined using a link-state routing protocol generally may be implemented via operations initiated at the nodes themselves, or via use of a centralized network management entity, such as a network manager 202 shown in FIGS. 2 and 2*a* (shown in dashed outline to indicate the usage of a network management entity is optional), or a combination of the two. For example, in one embodiment each node manages the link-state power level for its ports based on applicable power management input criteria and logic implemented at that node.

An alternative approach is to use a centralized network management entity to determine when link-state power changes should be effected. One advantage of using a centralized approach is that routing performance considerations that would result from changes to the network topology if a link is taken offline could be considered at a network level, rather than an individual link level. For instance, although each node maintains a least cost path routing tree, this doesn't imply that all packets sent between that node to other nodes in the network always use least cost routing paths. If that was the case, there would be no use for non-least cost routes. Rather, these higher cost paths may be used for differentiated service levels, such as using the least cost route paths for real-time services such as video or VoIP services, while using a portion of the higher cost paths for data services that are less time-critical. Since taking a link offline will alter the traffic loading on other links, there may be instances in which link-state power reduction criteria are met on a local level (i.e., as determined by the nodes connected by the link), while at the same time removal of the link will be projected to cause overloading on other links in the network. Under such circumstances, it would be desirable to keep the link up. This type of determination can typically be better made by a centralized network management entity having a holistic view of the network rather than individual nodes.

Distance-vector Routing Protocol

Distance-vector routing protocols may also be employed for determining network topology and least-cost routing paths. A distance-vector routing protocol requires that a router informs its neighbors of topology changes periodically. Compared to link-state protocols, which require a router to inform all the nodes in a network of topology changes, distance-vector routing protocols have less computational complexity and message overhead. The term distance vector refers to the fact that the protocol manipulates vectors (arrays) of distances to other nodes in the network.

Routers using distance vector protocol do not have knowledge of the entire path to a destination. Instead distance vector uses two methods:

1. Direction in which or interface to which a packet should be forwarded,
2. Distance from its destination.

An example of route cost discovery using a distance-vector routing protocol is illustrated via a network 500 in FIG. 5, and least cost path matrixes shown FIGS. 6a and 6b. Network 500 comprised four nodes A, B, C, D connected by four links AB, AC, BC, and CD. The cost of the path along each link is shown adjacent to the link.

During routing table initialization, each node creates a least cost path matrix of itself to its immediate neighbor nodes, and broadcast that distance vector matrix to its neighbors. Initial least cost path matrixes for each of nodes A, B, C, and D are shown in FIG. 6a, depicted at an initial time 0. The column headers in the matrixes (i.e., tables) identify the route taken to reach a node, and the row headers identify the nodes, with the upper left hand cell identifying the node for which the least cost path matrix applies. The cells marked in double cross-hatch are invalid routes (i.e., direct routes from the node back to the node), while the cells marked in single cross-hatch correspond to non-existing routes. For example, for node A there is no route to any of nodes B, C, or D that employ D as a first hop since D is not one of node A's neighbor nodes (i.e., a node that is directly linked to node A, also referred to as being linked via a single hop). Cells with numbers in them indicate the cost for corresponding routes defined by the column and row headers for the cell.

During successive iterations of the protocol, nodes that receive an updated least cost path matrix from a neighbor node will: Recalculate all least cost paths from itself to other nodes using the neighbor's broadcasted least cost path matrix information; and if its own least cost path matrix gets updated as a result of the recalculation; broadcasts its updated least cost path matrix to other neighboring nodes. The iterative update and broadcast process will stop when there are no least cost path matrix updates applicable to any node, and no node in the network topology has an updated least cost path matrix to broadcast.

The result of an exchange of least cost path matrixes between nodes A, B, C, and D is shown in FIG. 6b, depicted at an iteration time of 3. In these matrixes, numbers shown in cells with a white background are costs for least cost routes from the node for which the matrix applies to other nodes, while numbers in cells with gray backgrounds correspond to costs of non-least cost routes. As depicted in the updated least cost path routing matrix for node A, node of the costs for routes via node C are least-cost routes. Accordingly, the link corresponding to this path (i.e., link AC) is a candidate for power management. Similarly, the updated least cost path routing matrix for node C identifies all routes via node A as non-least cost routes.

Most Utilized Link Spanner Tree Protocols

In some embodiments, routing protocols and link power management decisions are implemented via use of a most utilized approach, rather than a least cost approach. This approach is similar to least cost routing in many respects, but may yield different spanning trees and associated actions, depending on the particular functions used for calculating link utilization and calculating link costs. In general, link cost and link utilization are related, often as an inverse function. For example, lower cost links are favored over higher cost links, and thus are utilized more than higher cost links. However, this is not universal, as in some instances a high cost link may also have high utilization and/or low cost links may have low utilization, depending on particular network configurations and workloads.

Routing protocols based on link utilization may be implemented for each of the STP, link-state, and vector-distance routing protocols. In general, the logic for determine the applicable protocol tree is based on preference for routing paths employing links with the greatest utilization in a manner somewhat similar to selecting routes paths with the least costs. To better understand this approach, the following example using a link-state type protocol is provided. However, this is not meant to limit this approach to link state, as it can also be applied to STP and vector distance routing protocols, as well as other routing protocols that are conventionally based using preference for least cost paths.

As before, a routing path tree is generated for the particular network based on applicable input criteria. In this instance, the primary criteria is link utilization, which may be typically be defined of a function of one or more parameters relating to utilization of a link. For example, a link utilization function may typically include such parameters as link bandwidth (usage and/or bandwidth margin), link QoS (Quality of Service) criteria, link (or network element) latency, etc.

Figure 7A:
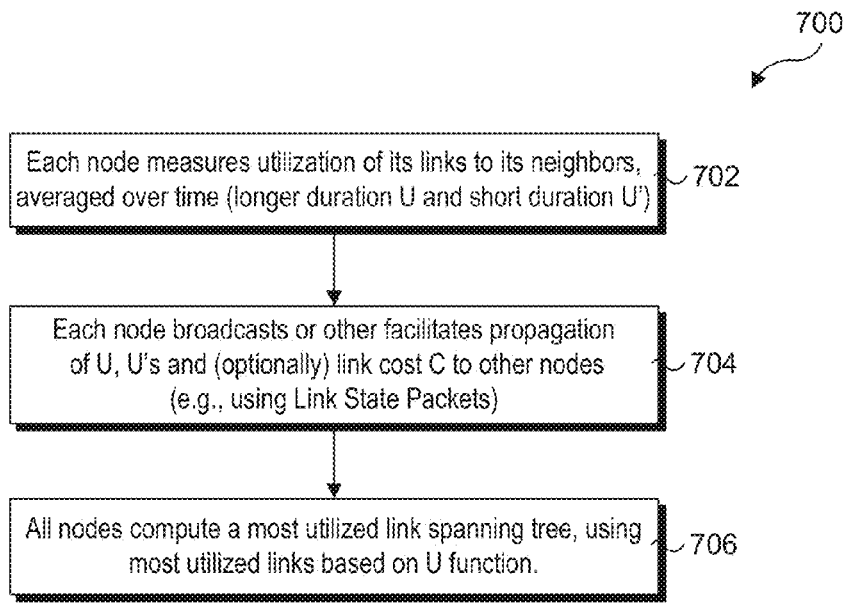
FIGS. 7a and 7b comprise flowchart portions illustrating operations and logic for generating a most utilized link spanning tree, according to one embodiment.
Figure 7B:
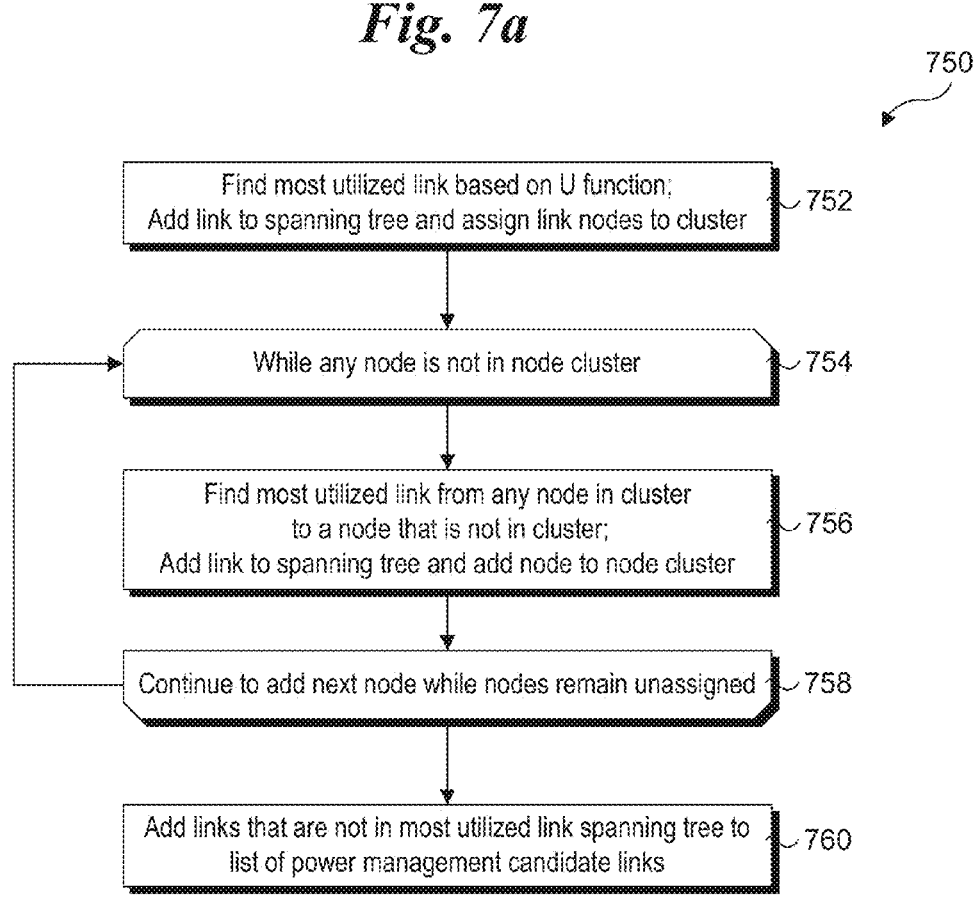

With reference to flowchart 700 and 750 respective shown in FIGS. 7a and 7b, logic and operations for determining a most utilization link path tree, according to one embodiment, proceeds as follows. The process begins in a block 702 of flowchart 700, wherein each node measures utilization of its links to each of its neighbor nodes. As describe in further detail below, one aspect of using a most utilization link path tree is to determine which links are candidates for power management, with both preference for keeping the most utilized links powered-up and also recognizing there may be performance costs associated with network reconfiguration. Accordingly, in one embodiment the detected link utilization values are averaged over a relatively long period, e.g., an extended time period comprising 12 or 24 hours, several days, one week, etc. As used herein, the link utilization determined for this extended time period is referred to as 'U'. In addition, a link utilization average over a shorter period is also measured periodically, and is referred to as 'U''. Optionally, the nodes may also calculate link cost estimates/measurements in the normal manner. The link cost is referred to as 'C'.

Figure 2B:
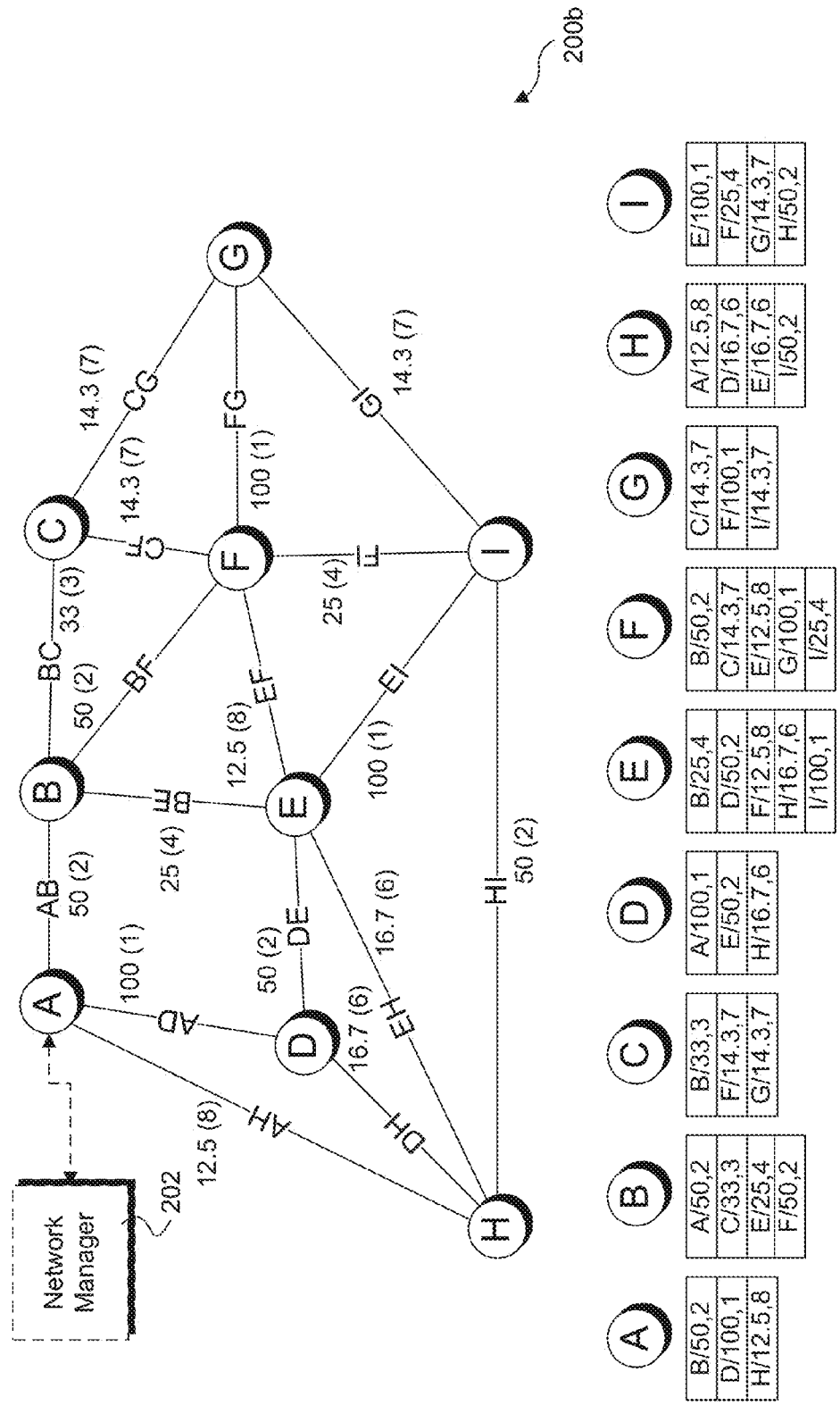
FIG. 2b shows a network having a common network topology as the network shown in FIG. 2, further depicting link utilization values.

An exemplary network configuration with U values assigned to the various network links is depicted as network 200b in FIG. 2b. As is readily observed, this network has the same node and link configuration as network 200. Moreover, the link cost for the nodes corresponding to network 200 are shown in parentheses following the U value. For example, the respective link utilization U and cost values for link AH are 12.5 and 8. For simplicity and point of comparison, the utilization value U for each link in this example is derived by taking 100 and dividing the link cost. As before, each node would maintain a list of link utilization U values for the links to its neighbors. As shown toward the bottom of FIG. 2b, a combination of link utilization U and cost C is stored at each node. (For simplicity, the shorter term link utilization U' values are not shown, but would also be stored at each node.)

As with the link state routing protocol, each node periodically broadcasts or otherwise facilitates propagation of its link state information (which now includes link utilizations U, U' in addition to link cost C values) to other nodes. This operation is shown in a block 704. In one embodiment the values are broadcast via Link State Packets (LSPs). Optionally, other propagation techniques may be employed, such as pass LSPs or equivalent information to network manager 202.

Figure 8A:
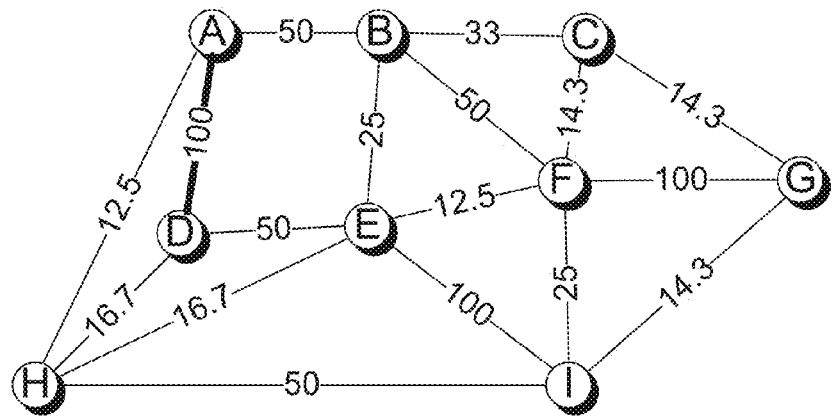
FIGS. 8a-8h illustrate generation of a most utilized link path routing tree for the network shown in FIG. 2b and in accordance with the flowchart of FIG. 7b.

In a block 706 all nodes (collectively) compute a most utilized link spanning tree (that is, a spanning tree derived from the most utilized links) via use of the U value for each link. This spanning tree is similar to a least cost path spanning tree, but is based on utilization values rather than link costs. Operations and logic for performing one embodiment for generating a most utilized link spanning tree are illustrated in flowchart 750, while a corresponding sequence for building a most utilized link spanning tree corresponding to network 200b is depicted in FIGS. 8a-8h First, in a block 752, the most utilized link based on the U value (and associated function for determining U) is determined. As shown in FIG. 2b, each of links AD, EI and FG have a utilization U of 100, so any of these would do. For convenience, an alphabetical tiebreaker will be used in this example, and thus link AD is selected. As shown in FIG. 8a, this link is added to the most utilized link spanning tree (added nodes are depicted via bolded lines), and nodes A and D are added to the tree's node cluster.

At this point, the logic performs a series of looped operations to fill out the remaining tree paths and node cluster until the cluster includes all of the nodes. This is depicted by start and end loop blocks 754 end 758 and block 756. During each evaluation of block 756, the most utilized link from any of the links in the node cluster to any link not in the node cluster is determined, and that link path is added to the spanning tree, while the node is added to the node cluster. This sequence for network 200b is depicted in FIGS. 8b-8h, and proceeds as follows.

Figure 8B:
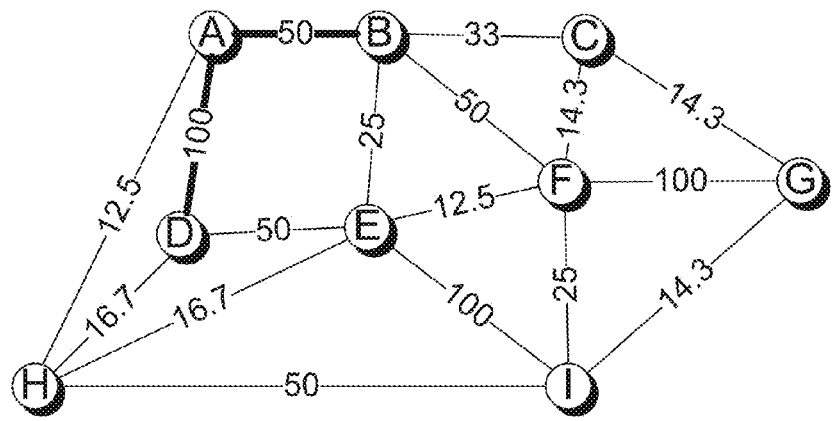
Figure 8C:
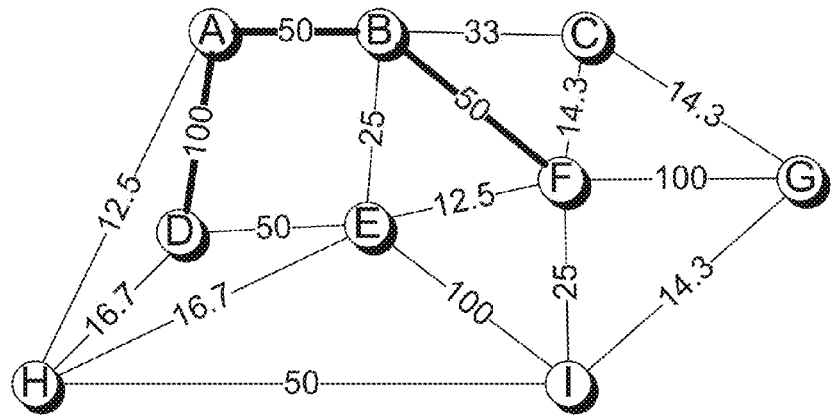

As shown in FIG. 8b the node cluster originally includes nodes A and D, and the most utilized links from these nodes are links AB and DE, each with link utilization U value of 50. Using the tie-breaker rule, link AB is selected, which adds it to the tree and node B is added to the cluster. Next, as shown in FIG. 8c, the most utilized links from the cluster nodes are BF and DE, and when the tie-breaker rule is applied link BF wins and is the next link added to the tree, with node F added to the cluster.

Figure 8D:
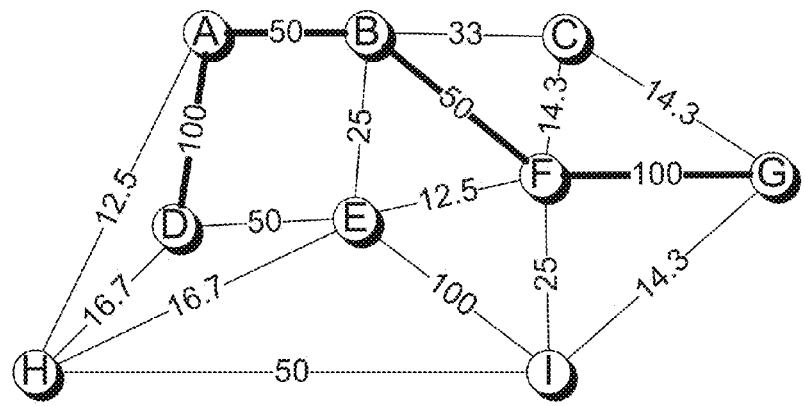
Figure 8E:
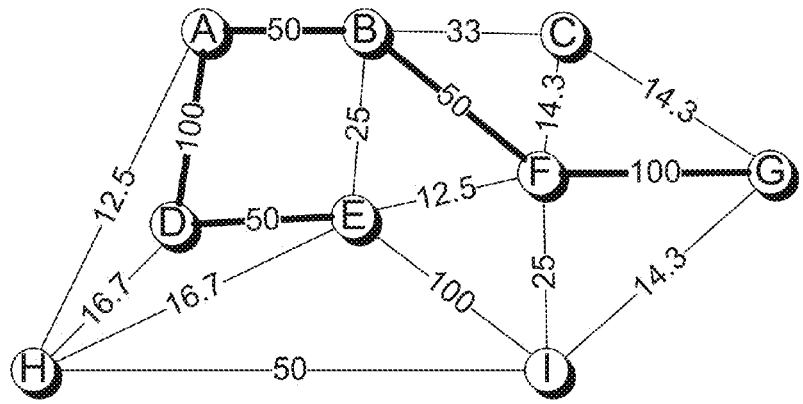
Figure 8F:
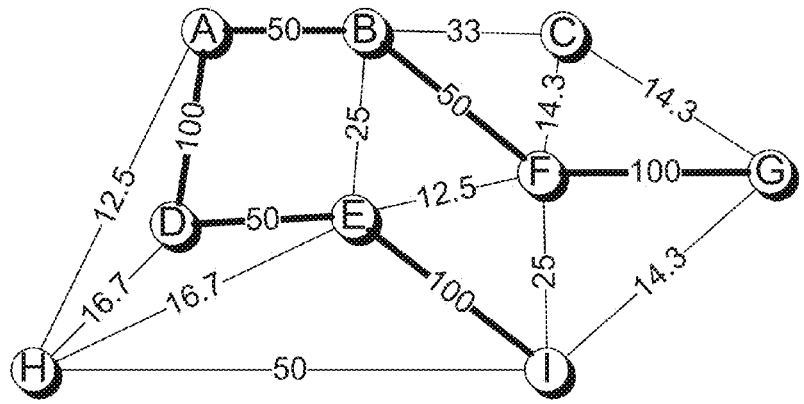
Figure 8G:
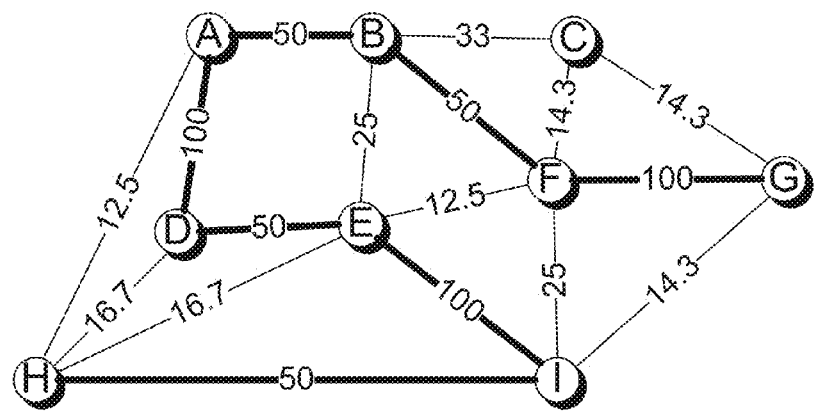
Figure 8H:
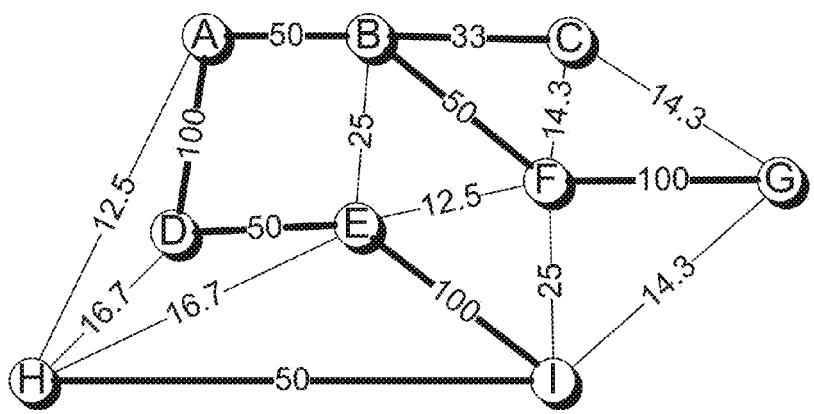

Continuing at FIG. 8d, link FG with a U value of 100 is easily the next winner, resulting in link FG being added to the tree and node G added to the node cluster. As shown in FIG. 8e, the next winner is link DE, which is added to the tree, and node E is added to the node cluster. This is followed by the addition of links EI, IH, and BC to the tree, as shown in FIGS. 8f, 8g, and 8h, respectively. At the state shown in FIG. 8i all the nodes are connected via the tree, completing the process.

Figure 8I:
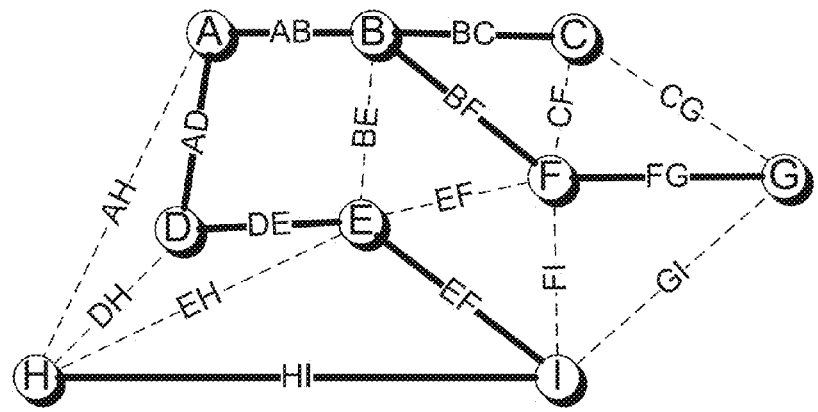

In accordance with one embodiment, during ongoing operations links that are included in the most utilized link spanning tree are maintained in a normal operating condition (i.e., full-power condition), while links that are not part of the tree are candidates for power management (i.e., operating at a reduced power level), as explained in further detail below. Accordingly, those links are added to a power management candidate list, as depicted in a block 760. This links are also depicted in FIG. 8i as dashed lines.

The examples shown in FIGS. 2, 2a, and 2b yield the same trees, which is to be expected when considering the similarities for spanning trees involving least cost and most utilized links in combination with utilization being set to 1/link cost in the network 200b of FIG. 2b. Another way to look at this that also yields the same result is if link costs are determined as a function of 1/link utilization and a least cost link spanning tree is determined, the trees for both link utilization and least cost will be the same. To carry this analogy further, most utilized link spanning trees may be derived using other routing protocols, including STP and distance vector. As with the link-state approach, rather than basing selections on least cost, links are selected based on most utilization.

To clarify, the preceding examples are not intended to convey there is always a relationship between link cost paths and link utilization, since while this may be the case in some instances it typically will not. Moreover, the functions used for determining link cost and link utilization may employ parameters that do not have inverse relationships. Rather, these examples are used to show that most utilization link spanning trees may be determined in a manner analogous to determining least cost link spanning trees.

Link/Port Power Management Protocols

As discussed above, embodiments of network routing protocols disclosed herein may be implemented to facilitate power savings in network elements such as switches, routers and bridges. The foregoing network discovery, least cost link path, and most utilized link path routing protocols may be employed in specific embodiments corresponding to their applicable network architectures and/or operations. However, while these aspects are somewhat particular, more general aspects of the principles and teachings disclosed herein may be implemented for various types of network architectures.

Figure 9:
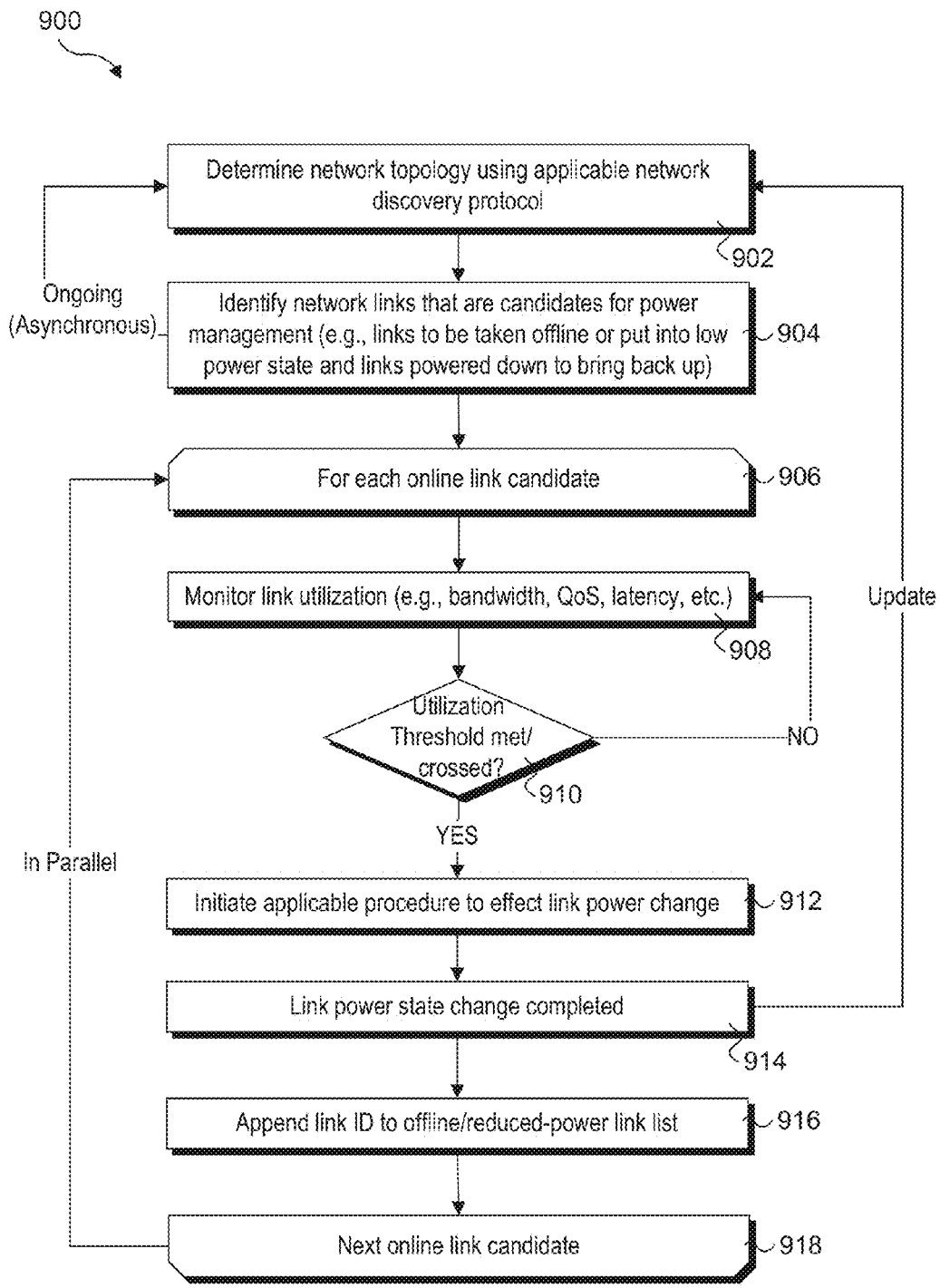
FIG. 9 is a flowchart illustrating operations and logic for implementing a network routing power management protocol to reduce the power state of selected links, according to one embodiment.

FIG. 9 shows a flowchart 900 illustrating operations and logic for facilitating selective power reduction in network elements, according to one embodiment. The flowchart depicts two blocks 902 and 904 at its top that are performed on an ongoing basis. In block 902, network topology is determined using an applicable network discovery protocol. As a corollary operation in block 904, network links that are candidates for power management are identified based on the applicable routing protocol. For example, under various embodiments protocols employing least cost path routing and most utilized link path routing may be implemented. As the power states of various links and corresponding ports of network elements are changed during run-time network operations, the network topology will change, which may result in a change to the pool of links that a candidates for power management. In addition, the costs of path segments (i.e., links) and/or link utilization values may change, leading to updated least cost routing paths and/or most link utilization routing paths, resulting in an updated set of links that are power management candidates. Depending on the network architecture, one or more network discovery techniques may be used, such as, but not limited to the Spanning Tree Routing protocol, the link-state protocol, and the distance vector routing protocols discussed above.

The operations and logic corresponding to the remaining portion of flowchart 900 delineated by start and loop block 906 and 918 are also performed on an ongoing basis for each link that is a candidate for power reduction. As depicted by a block 906 and a decision block 910, link utilization U'0 (i.e., link utilization averaged over a relatively short period compared with link utilization U) is monitored to detect for conditions when the level of link utilization meets or crosses a utilization threshold. The general concept behind using link utilization is there are link conditions under which it may not be advantageous to drop a (using conventional parameters) link that is a candidate for power management if that link is being sufficiently utilized.

The link utilization threshold may be applied generally across a network, or may be link-specific. For example, a network administrator or the like could assign utilization thresholds for selected (or all) links, and if the utilization of a given link fell below its threshold, the link power state could be reduced by putting the applicable link ports in a lower-power state or taking the link offline by powering off the ports. Optionally, all or a portion of the utilization thresholds could be computationally determined by the network elements themselves, by a central network management entity or distributed network management entities, or other means employing applicable logic and/or algorithms to determine applicable link utilization thresholds.

Generally, the link utilization threshold may be based on one or more factors relating to link utilization, such as but not limited to utilized bandwidth, average packet latency, QoS parameters, etc. A utilization threshold value may also comprise a value derived by combining multiple weighted utilization factors. In addition, a link utilization threshold may be based on certain class of service criteria for a given link. For example, if a link supports multiple classes of service, there may be a link utilization threshold for two or more classes of service such that the utilization thresholds for all applicable classes of services need to be crossed or otherwise met before a link power-state change may be effected.

Continuing at decision block 910, in response to detection that an applicable link utilization threshold has been crossed or is otherwise met (i.e., if a link becomes a new candidate for power management and is already being utilized at a level below the threshold), an applicable procedure is initiated to effect a corresponding link power state change, as depicted in a block 912. Further details relating to embodiments for effecting link power state changes are discussed below with reference to the flowchart 1000 of FIG. 10.

As depicted by a block 914, once the link power state change has been completed, the logic loops back to block 902, wherein the new topology of the network is discovered followed by a redetermination of the power management candidate links in block 904. As stated above, these are ongoing operations, such that when a link power state changes, the network topology is updated to reflect the change, including determining least cost paths or other applicable routing determinations that are relevant to the particular network architecture and routing path protocol used.

In one embodiment, an ordered list of link power state changes is employed for subsequent determination of the order in which powered-down links should be brought back up. For example a Last-On First Off (LIFO) algorithm may be implemented to determine an order in which offline or idle links should be brought back online. Accordingly, in a block 916 the link ID of the link for which power reduction is effected is added to a link power-state change list. In general, the list may be maintained by an individual network elements and/or a centralized network management entity.

Figure 10:
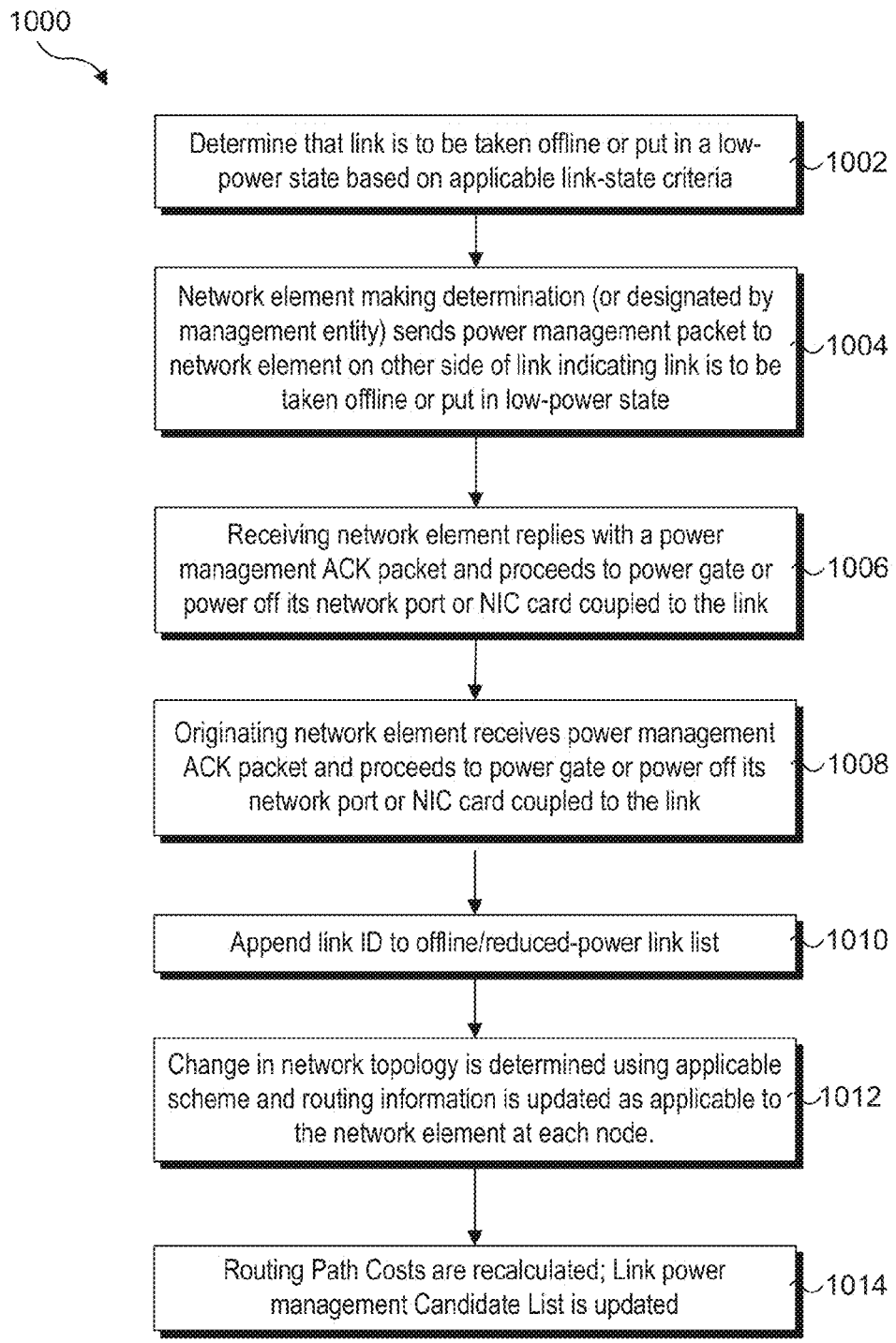
FIG. 10 is a flowchart illustrating operations for putting a network link and associated network ports in a reduced power state, according to one embodiment.

Flowchart 1000 of FIG. 10 depicts operations for effecting a change in link power state, according to one embodiment. The process begins in a block 1002 wherein a determination that a link is to be taken offline or put in a lower-power state based on applicable link-state criteria has been made. For example, in accordance with flowchart 900, applicable link utilization threshold criteria would be considered.

In a block 1004, the network element making the determination (or a network element designated by a centralized network management entity responsible for power management of links) sends a power management packet to the network element on the other side of the link indicating the link is to be taken offline or put in a low-power state, such as an idle state. The receiving (of the power management packet) network element replies to the sending element with a power management ACKnowledge packet, and proceeds to power gate or power off its network port or NIC card coupled to the link, as shown in a block 1006. In response to receipt of the ACK packet, the originating (of the packet exchange) network element also proceeds to power gate or power off its network port or NIC card coupled to the link, as shown in a block 1008.

In addition to effecting power changes at a network port of NIC, applicable measures may be taken to handle delivery of packets that are currently buffered for the applicable port. For example, packets waiting to be transmitted outbound via a port are typically stored in an egress buffer or the like. In addition, there may be separate egress buffers for different classes of service. Moreover, these buffers may comprise physically allocated buffers (e.g., buffers built into the port or NIC), or memory mapped buffers. Typically, the easiest way to handle buffered outbound packets is to empty out the applicable buffer(s) prior to powering down an outbound port. Otherwise, it may be necessary to remap a buffered packet to be routed out a different outbound port, which could include modifying packet header information depending on the routing protocol being used.

Returning to block 1006, there may also be a need to consider packets that are in transit when a link is taken offline. When packets are routed over a single physical link between two network elements, the order in which the packets are sent outbound on a sending port will be the same as the order the packets are received at the inbound port of the recipient. With this in mind, the timing of the power management packet exchange of blocks 1004, 1006, and 1008 proceeds as follows, in one embodiment.

First, the network element initiating the power management message exchange (also referred to as the originating network element or node) prepares for its port power-state change by blocking incoming packets received at its other ports from being routed outbound through the port, which will prevent any new packets from being added to the outbound buffer(s) for the port. A typical way to effect this is to modify the routing logic (e.g., remapping routing table information) within the network element. Next, the network element will continue to send currently buffered outbound packets via the port. After the outbound buffers have been cleared, the network element sends the first power management packet to the network element at the other end of the link, which initiates its link power state change process. In a manner similar to the originating network element, this network element remaps its routing table to reflect the port (to be taken down) is no longer available, and then clears out the packets in its outbound buffer(s) for the port. After the buffer(s) is/are cleared, the power management ACK packet is sent. By performing the power management packet exchanges in this manner, it is ensured that no packets are lost in transit between the ports.

Returning to flowchart 1000 at a block 1010, after the link power state change has been effected, the link-state change and link ID is added to the link power change list, in an operation similar to that described for block 916 above. As shown in a block 1012, the change in network topology is determined using an applicable scheme and routing information for the network nodes are updated, as applicable. For example, for a link-state routing algorithm, the link-state information corresponding to the link taken offline is propagated to the other network elements through link-state packets in the conventional manner. Similarly, for distance-vector routing algorithms, the distance vector matrix for the nodes connected via the link are updated, with applicable routing information being propagated throughout the network.

For implementations employing a centralized network management entity, a power management ACK message or the like could be sent from the originating network element to the central network management entity to inform it of the change in the network topology. This information could then be used to recalculate link path costs via the centralized network management entity or for other purposes.

The flowchart operations are completed in a block 1014, in which the routing paths costs are recalculated (as applicable), and the link power management candidate list is updated. These operations are similar to those discussed above for blocks 902 and 904.

Figure 11:
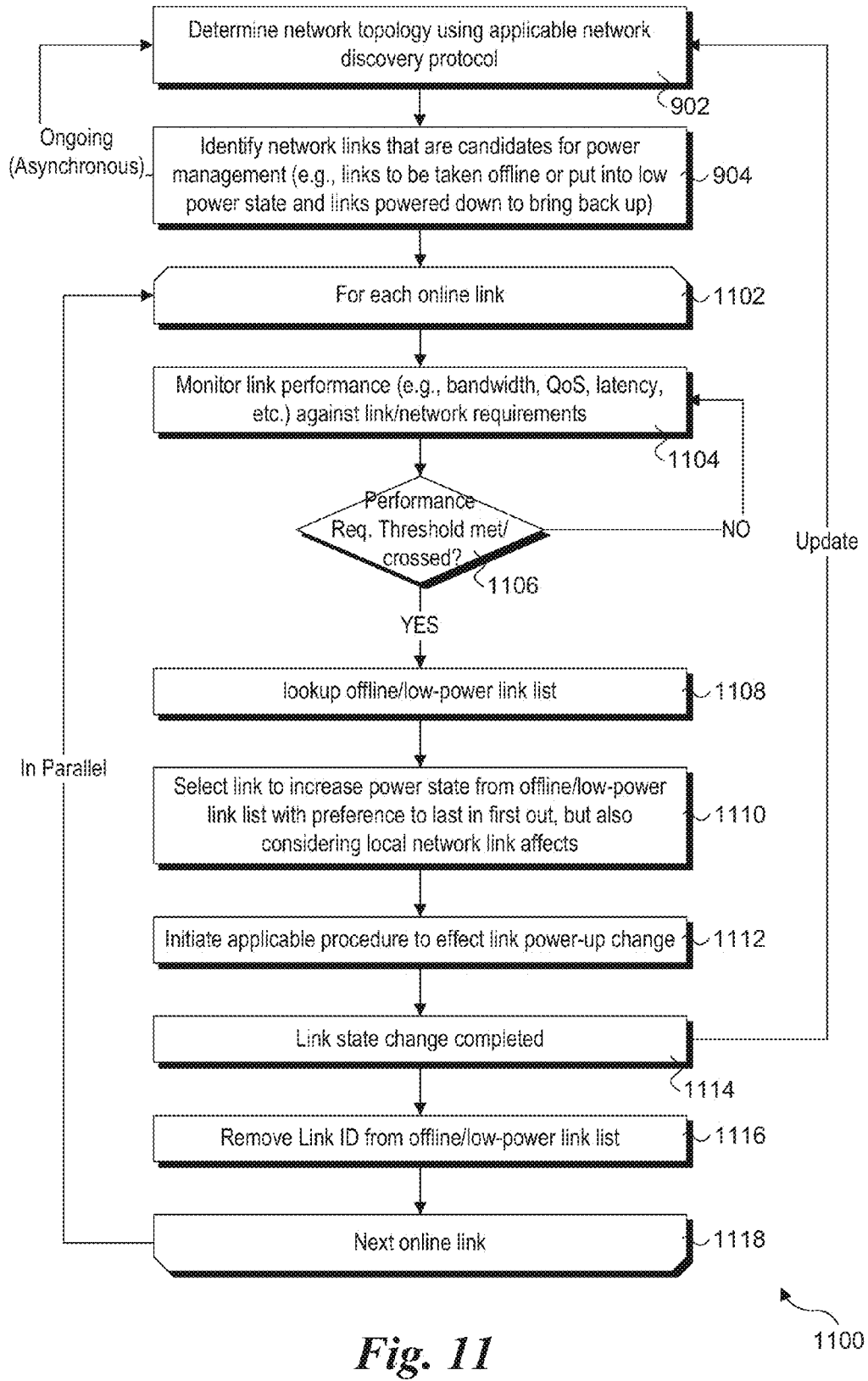
FIG. 11 is a flowchart illustrating operations and logic for implementing the network routing power management protocol to selectively return links having reduced power states to higher power operational states, according to one embodiment.

In addition to selectively powering down links to effect power savings, embodiments are provided that also selectively power up links that have been taken offline or put in a low-power state. FIG. 11 shows a flowchart 1100 illustrating operations and logic performed in connection with increasing the power states of links operating under reduced power states, according to one embodiment.

The operations in the top two blocks 902 and 904 are similar to those discussed above for blocks 902 and 904 in flowchart 900. As before, these operations are performed on an ongoing basis during network operation.

Also similar to flowchart 900, flowchart 1100 contains a second loop defined by start and end loop blocks 1102 and 1118 including operations and logic that apply to the network nodes and links. In a block 1104, the performance of the links are monitored, and in a decision block 1106 a determination is made to whether the link performance meets a performance threshold. The performance level of a link may be determined by one or more link performance factors, such as link bandwidth, link QoS criteria, link (or network element) latency, etc. In addition, other factors relating to link utilization may be considered.

Typically, taking a link offline will result in a change in traffic flow within portions of a network proximate to the link, and, depending on the size of the network, traffic flow changes may be felt at other nodes in the network. Since removing (effectively due to powering down) a link means a routing path is no longer available, the traffic that would normally be routed along that path must be routed along another path. Depending on the headroom of the bandwidth and/or other performance factor criteria defined for the network, removal of a link may or may not have a significant enough affect to cross an applicable performance threshold. This concept also ties into selective powering down of links through use of a centralized or distributed network management entity—if taking a link offline is projected to create a performance threshold condition elsewhere, the link should not be taken offline. In some embodiments, this type of determination will not be available to individual network elements that are configured to perform link/port power management operations on their own, since they will not be aware of the "full picture" of the network traffic flow. For example, when a distance vector routing protocol is employed, a given node has little visibility to the network topology outside of its neighbor nodes.

Performance thresholds also may be crossed during conditions under which there have been no recent link power changes. For example, suppose that during late night and early morning hours network links are selectively taken offline. When the morning (and associated increase in traffic) comes, various link performance thresholds may be tripped. Accordingly, in response to these conditions, powered down links should be selectively brought back online.

As depicted by the operations in block 1108 and 1110, the link to be brought back online is selected from a list of offline and low-power links based on applicable selection criteria. As discussed above, in one embodiment a LIFO algorithm is used to determine an order to bring links back online. Accordingly, in block 1108 a lockup is made into a corresponding list of links that are in a reduced power state and were previously added in block 916 above such that the list order reflects the order in which the links entered their reduced power states. In one embodiment, the list may be maintained in the form of a stack, wherein added link ID's are added to the stack as they are powered down and the link to be brought back online is accessed by popping the top entry off of the stack. Use of an ordered link list or stack is particularly well-suited to implementations in which link power states are managed by network elements.

Conversely, when a central network management entity is used, the appropriate link to bring back up may not be the last one taken offline if that link corresponds to a different part of the network in which a performance threshold event is detected. For example, suppose a network is configured such that its topology is laid out from left to right and nodes are assigned alphabet letters from A-Z such that node A is at the far left of the network and node Z is at the far right. Further suppose that link AB was the most recent link taken offline, but that a performance threshold event is detected at link YZ. It would make little sense to bring node AB back up, since this would have minimum impact on the performance condition at nodes Y and Z. Accordingly, in some embodiments, local network link affects are prioritized over use of a LIFO ordering.

Continuing at a block 1112, applicable procedures are then implemented to effect link power up. Details for performing these operations are discussed below with reference to flowchart 1200 of FIG. 12. After the link state change has been completed, as depicted at a block 1114, the logic loops back to block 702 to rediscovery the network topology. As discussed above, this can be implemented using various techniques and network topology discovery protocols. Continuing at a block 1116, the link ID corresponding to the link that is powered back up is removed from the list of links that are offline or have reduced power states. In accordance with the stack technique, popping that top link (ID) off of the stack will simultaneously perform the operations of blocks 1110 and 1116.

Figure 12:
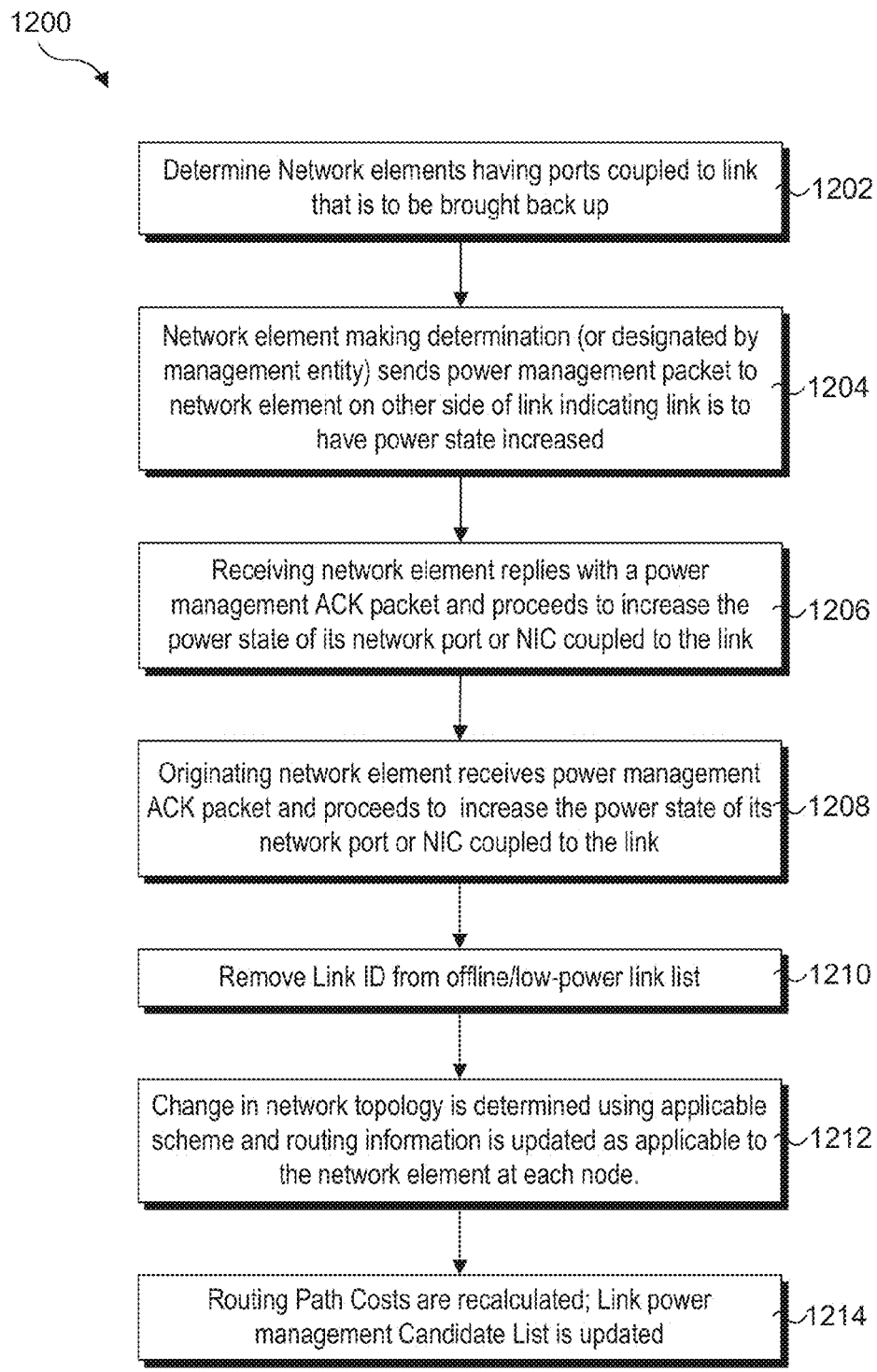
FIG. 12 is a flowchart illustrating operations for returning a network link and associated network ports from a reduced power state to a higher power operational state, according to one embodiment.

Now turning to flowchart 1200 Of FIG. 12, a first operation for bringing a link back up is to determine the network elements having ports coupled to the link, as shown in a block 1202. Next, in a block 1204 the network element making the determination to power the link back up or the network element designated by a central network management entity (which would be apprised of the change via a message routed from the central entity to the network element) sends a power management packet to the network element on the other side of the link indicating the link is to be powered back up to bring online. For situations where the direct link between the two network element is offline, the packet will need to be routed along another route, which is easily handled by network routing protocols. If the link is in a reduced power state, such as an idle state, it may be possible to send the packet over the link.

Regardless of the route employed, the network element on the other side of the link receives the power management packet, replies with a power management ACK packet and proceeds to power up its network port, NIC, or NIC card coupled to the link. Bringing a link back up is generally less complicated that taking it down, since there are no buffered packets that need to be considered. However, the network element should preferably update its routing logic to handle incoming packets and outgoing packets using the port that is brought back online. Depending on the latency of this process, it may be preferable to bring the port back up and reconfigure the routing logic prior to sending the power management ACK message.

As before, if the prior link state was in an offline state, the link will still be unavailable for returning the ACK message, since in order for a link to be operational the ports at both ends of the link need to be in an operational state. Also as before, if the link was in a reduced power state but not offline, the ACK message could be returned via the link.

Upon receiving the ACK message, the originating network element initiates its own link port power up operations, as shown in a block 1208. These link port power operations performed by the network elements at both ends of the link will generally be similar, such as that described above. In connecting with bringing a link back up, the link ID for the link is removed from the reduced power/offline link list, as depicted in a block 1210.

At this point, a change to the network topology has occurred, which is detected using an applicable technique in a block 1212 in a manner similar to block 1012 described above. The routing path costs are then recalculated, and the link power management candidate list is updated in a block 1214.

Determining Path Segment (Link) Costs

As discussed throughout, path route costs are employed by the various routing protocols. The cost for a given route is the sum of the costs of the individual path segments, i.e., links. In some embodiments, the path route cost between a pair of nodes A, B (that is the cost for routing on a path segment or link between nodes A and B) may be based on the following:

1. The total routing distance between nodes A and B.
2. The link bandwidth between nodes A and B.
3. The average time needed to route a packet from node A to B (i.e., routing latency)
4. Other packet routing costs as determined by a user or network administrator.
5. Any combination of the above.

Typically, one or more of these inputs comprise an average for the particular Parameter(s) over a time period of reasonable length to ensure that the network routing topology is not constantly changing in response to intermittent changes in link traffic patterns.

The total routing distance may comprise a number of hops between nodes, in cases where switching latency represents a significant portion of packet routing latency relative to link latency. Since packet travels along an optical or wired link at a speed approaching the speed of light, the latency for the traversing the link segments is typically very small. Link bandwidth becomes significant once the load on a given link would exceed the available bandwidth for the link (i.e., the link becomes overloaded to the point a maximum bandwidth is reached). In order to accommodate this situation, packets are buffered at link ingress points (e.g., switch ports), resulting in increased routing latency. Average time needed to route a packet from node A to B represents the average routing latency, which is typically dominated by the switch latencies. A network administrator may also assign packet routing costs to selected links based on various criteria, such as QoS requirements, observed traffic patterns, cost values averaged over longer time periods, etc.

In accordance with aspects of some embodiments, an additional factor comprising link utilization is used for determining routing paths and/or otherwise employed to determine when selected ports may be put in a low power state or powered off to reduce power consumption while maintaining QoS and/or other criteria relating to network routing performance, as discussed above. In one embodiment, link utilization if factored into the routing path costs. For example, since it is advantageous to keep highly utilized links up, the routing path cost algorithm could reduce the routing cost across a particular link and/or network element based on its level of utilization. For example, a routing path cost for a link or network element is determined as a function of the factors discussed above, and then divided by a link utilization level. Moreover, various weighting factors may be applied to the various inputs to tune the link power management routing protocols.

Once appropriate conditions are detected for a link being taken off-line or put into a reduced power state (while keeping the link up), information is provided to appropriate network elements to power down applicable ports or put those ports in a reduced power state. Under one embodiment, this is facilitated in the following manner.

Exemplary Implementation Environment and Blade Server Architecture

In accordance with some embodiments, it is envisioned that one or more of the power management routing protocols disclosed herein may be implemented in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers. For reliability purposes, portions of the servers are employed for data replication, such that if a given server goes down, there is still at least one other server with an instance of the data (generally, there will be multiple backup instance). In addition, some cloud services employ geographic data replication, under which data is replicated across data centers at separate geographic locals so that if communication to one of the data centers is comprised, cloud services may be facilitated via another data center.

As an overview, typical blade server components and systems are shown in FIGS. 13a-c, and 14. Under a typical configuration, a rack-mounted chassis 1300 is employed to provide power and communication functions for a plurality of server blades (i.e., blades) 1302, each of which occupies a corresponding slot. (It is noted that all slots in a chassis do not need to be occupied.) In turn, one or more chassis 1300 may be installed in a blade server rack 1303 shown in FIG. 13c. Each blade is coupled to an interface plane 1304 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 13A:
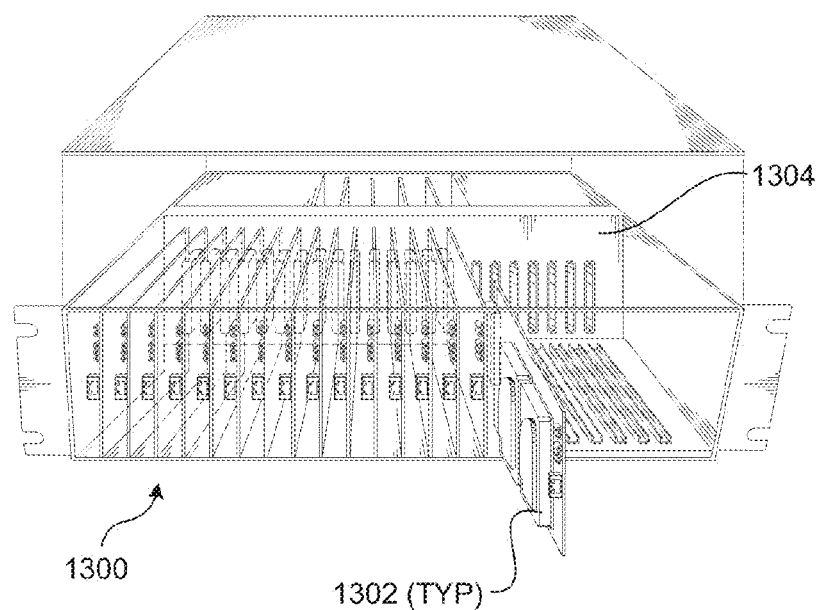
FIG. 13a is a frontal isometric view of an exemplary blade server chassis in which a plurality of server blades is installed.
Figure 13B:
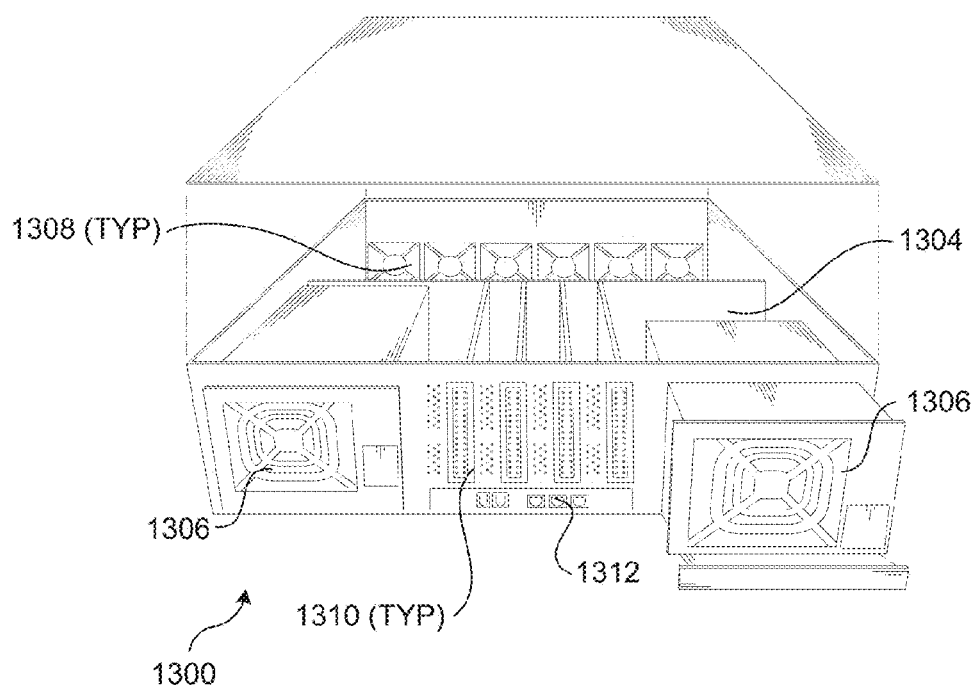
Figure 13C:
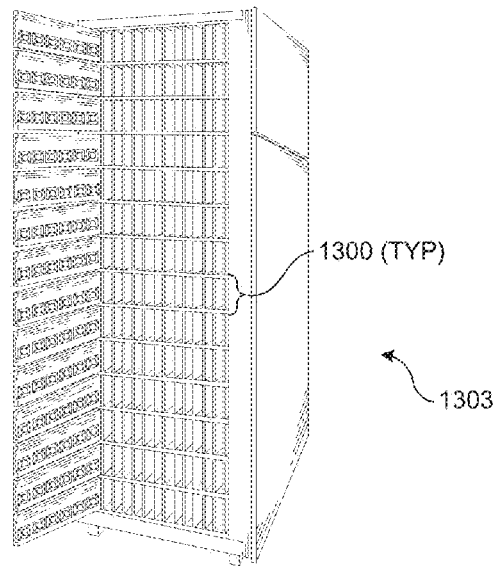
FIG. 13c is an isometric frontal view of an exemplary blade server rack in which a plurality of rack-mounted blade server chassis corresponding to FIGS. 13a and 13b are installed.

A typical mid-plane interface plane configuration is shown in FIGS. 13a and 13b. The backside of interface plane 1304 is coupled to one or more power supplies 1306. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1308 are employed to draw air through the chassis to cool the server blades.

An important feature required of all blade servers is the ability to communicate externally with other IT infrastructure. This is typically facilitated via one or more network connect cards 1310, each of which is coupled to interface plane 1304. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1312 that is coupled to the backside or frontside of the interface plane. As yet another option, a management or configuration server may be employed to manage blade activities, wherein communications are handled via standard computer networking infrastructure, for example, Ethernet.

Figure 14:
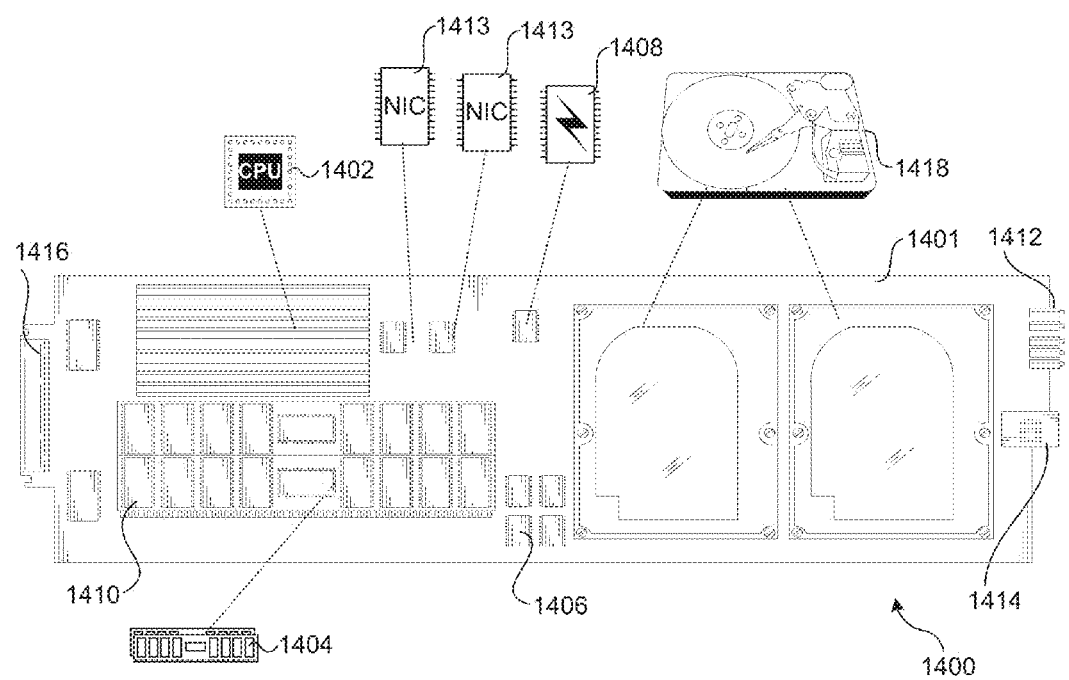
FIG. 14 shows details of the components of a typical server blade, according to one embodiment.

With reference to FIG. 14, further details of an exemplary blade 1400 are shown. As discussed above, each blade comprises a separate computing platform that is configured to perform server-type functions, i.e., is a "server on a card." Accordingly, each blade includes components common to conventional servers, including a main printed circuit board (main board) 1401 providing internal wiring (i.e., buses) for coupling appropriate integrated circuits (ICs) and other components mounted to the board. These components include one or more processors 1402 coupled to system memory 1404 (e.g., DDR (double data rate) RAM), cache memory 1406 (e.g., SDRAM), and a firmware storage device 1408 (e.g., flash memory). A "public" NIC (network interface controller) chip 1410 is provided for supporting conventional network communication functions, such as to support communication between a blade and external network infrastructure. Other illustrated components include status LED (light-emitting diodes) 1412, one or more NICs 1413 coupled to a set of RJ-45 console ports 1414 (only one of which is shown for simplicity), and an interface plane connector 1416. Additional components include various passive components (i.e., resistors, capacitors), power conditioning components, and peripheral device connectors.

Generally, each blade 1400 may also provide on-board storage. This is typically facilitated via one or more built-in disk controllers and corresponding connectors to which one or more disk drives 1418 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data.

NICs 1413 comprise circuitry and logic for facilitating corresponding networking operations, such as support for physical layer (L1) and data link layer operations (L2). Typically, upper layer operations are facilitated by an operating system network stack that would be hosted by an operating system running on processor 1402. However, in some embodiments, a NIC may employ its own network stack via embedded logic or the like.

In a typical data center deployment, network elements comprise rack-mounted equipment, such as would occupy a 1U, 2U or 4U slot, or may be implemented via one or mare server blades. Optionally, a network element may be implemented use one or more server blades. Network elements implemented for high-speed network infrastructure, such as large-scale network switches and routers made by companies such as Cisco Systems, Alcatel-Lucent, and Juniper Systems, typically comprise chassis (either standalone or rack mounted) with multiple cards, each including one or more network interfaces and corresponding network ports. Some aspects of these network interfaces are similar to NICs deployed for Ethernet networks, while others are different. For example, the physical layer for high-speed optical links is different than that used for Ethernet. In addition, there may be differences in the link layer, depending on the particular switch or router technology. Generally, the routing logic for large-scale network elements is more sophisticated than other classes of switches and routers since these devices often support multiple server class levels, and may perform auxiliary services such as packet inspection. Large-scale network elements also may be suitable for performing operations discussed herein as being performed by a centralized network management entity. Moreover, the "centralized" does not imply that only a single management entity may used for network management, but rather that one or more such entities may be implemented, depending on the size and other aspects of the network.

In general, aspects of the power management protocols may be implemented via software, hardware (via, e.g., embedded logic), or a combination of the two. For example, a network element may include a processor running a software-based network stack and associated logic implemented via software for performing aspects of the operations described herein. Optionally, similar logic could be implemented via embedded logic in a NIC, large-scale network interface, or the like.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, Feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. A method comprising:
  determining a network topology in a network comprising a plurality of network elements comprising nodes linked in communication via a plurality of links;
  based on utilization of the links, identifying links among the plurality of links that are candidates for power management and links that are not candidates for power management;
  effecting operation of links that are not candidates for power management at full power;
  detecting, from among the links that are candidates for power management, a condition under which a power state of a link may be changed, the condition comprising a link power-state change condition and being determined as a function of utilization of the link; and
  effecting a change in the power-state for the link by effecting a change in the power state of first and second ports of respective first and second network elements linked in communication via the link.

2. The method of claim 1, wherein effecting a change in the power state for a link comprises taking the link offline by effecting powering off network interfaces corresponding to the first and second ports.

3. The method of claim 1, wherein effecting a change in the power state for a link comprises effecting a reduction of a power state to an idle state for each of the first and second ports.

4. The method of claim 1, further comprising identifying links among the plurality of links that are candidates for power management as a function of longer term link utilization, wherein the longer term link utilization is measured over an extended time period.

5. The method of claim 1, further comprising detecting a condition under which a power state of a link is to be changed based on a utilization level of the link, where the utilization level of links is determined using relatively short time periods.

6. The method of claim 1, further comprising employing a network element to detect a link power-state change condition.

7. The method of claim 1, further comprising employing a network management entity to detect a link power-state change condition.

8. The method of claim 1, wherein effecting a power state change for the link comprises:
   sending a power management packet from the first network element to the second network element indicating a change in link power state to be effected at the second network element by changing the power state of the second port;
   receiving a power management ACK packet from the second network element at the first network element; and
   changing the power state of the first port in accordance with the link power state identified in the power management packet.

9. The method of claim 1, further comprising:
   determining an updated network topology in the network in response to at least one of a change in the power state of one or more links and a change in network traffic; and
   updating a list of links that are candidates for power management in view of the updated network topology.

10. The method of claim 1, wherein determining the network link topology and identifying links that are candidates for power management comprises:
    identifying nodes and links connecting the nodes;
    determining a utilization of the links;
    determining a most utilized link spanning tree for the network link topology; and
    identifying links that are not links in the most utilized link spanning tree as candidates for power management.

11. The method of claim 10, further comprising employing a link-state protocol using the utilization of the links to determine link paths in the most utilized link spanning tree.

12. The method of claim 10, further comprising employing a distance vector routing protocol using the utilization of the links to determine link paths in the most utilized link spanning tree.

13. The method of claim 10, further comprising
    employing a Spanning Tree protocol using link utilization as a routing criteria to determine ports in the network elements comprising root ports and designated ports; and
    identifying links that are not coupled to a root port or a designated port as a candidate for power management.

14. The method of claim 1, further comprising:
    detecting a network condition under which a link in a reduced power state is to be brought back to a higher power state; and
    effecting a power state change for the link by effecting a change in the power state of network element ports coupled to the ends of the link from a reduced power state to a higher power state.

15. The method of claim 14, wherein the network condition under which a link in a reduced power state is to be brought back to a higher power state is detected as a function of one or more link and/or network performance factors.

16. The method of claim 15, wherein the network condition under which a link in a reduced power state is to be brought back to a higher power state is detected by a network element.

17. The method of claim 15, wherein the network condition under which a link in a reduced power state is to be brought back to a higher power state is detected by a network management entity.

18. The method of claim 1, further comprising:
    maintaining a list of links that have been put into a reduced power state;
    detecting a link power up condition, under which a link in a reduced power state is to be powered up to a higher power state; and
    selecting a link to power up from the list of links that have been put into a reduced power state.

19. The method of claim 18, further comprising:
    maintaining an ordered list of links put into a reduced power state; and
    selecting the last link added to the ordered list as the first link to power back up.

20. An apparatus comprising:
    a processor
    memory, operatively coupled to the processor;
    a network interface;
    a storage device, having instructions stored therein configured to be executed by the processor to cause the apparatus to perform operations including,
       coupling the network interface in communication with a network comprising a plurality of network elements comprising nodes linked in communication via a plurality of links;
       determining a network topology in the network;
       based on utilization of the links, identifying links among the plurality of links that are candidates for power management and links that are not candidates for power management;
       effecting operation of links that are not candidates for power management at full power;
       detecting, from among the links that are candidates for power management, a condition under which a power state of a link may be changed, the condition comprising a link power-state change condition and being determined as a function of utilization of the link; and
       effecting a change in the power-state for the link by effecting a change in the power state of first and second ports of respective first and second network elements linked in communication via the link.

21. The apparatus of claim 20, wherein effecting a change in the power state for a link comprises taking the link offline by effecting powering off network interfaces corresponding to the first and second ports.

22. The apparatus of claim 20, wherein effecting a change in the power state for a link comprises effecting a reduction of a power state to an idle state for each of the first and second ports.

23. The apparatus of claim 20, wherein execution of the instructions cause the apparatus to perform further operation comprising identifying links among the plurality of links that are candidates for power management as a function of longer term link utilization, wherein the longer term link utilization is measured over an extended time period.

24. The apparatus of claim 20, wherein execution of the instructions cause the apparatus to perform further operation comprising detecting a condition under which a power state of a link is to be changed based on a utilization level of the link, where the utilization level of links is determined using relatively short time periods.

25. The apparatus of claim 20, wherein determining the network link topology and identifying links that are candidates for power management comprises:
    identifying nodes and links connecting the nodes;
    determining a utilization of the links;
    determining a most utilized link spanning tree for the network link topology; and identifying links that are not links in the most utilized link spanning tree as candidates for power management.

26. A tangible non-transitory machine readable medium comprising a plurality of instructions that in response to being executed by an apparatus to cause the apparatus perform operations comprising:
coupling a network interface of the apparatus in communication with a network comprising a plurality of network elements comprising nodes linked in communication via a plurality of links;
determining a network topology in the network;
based on utilization of the links, identifying links among the plurality of links that are candidates for power management and links that are not candidates for power management;
effecting operation of links that are not candidates for power management at full power;
detecting, from among the links that are candidates for power management, a condition under which a power state of a link may be changed, the condition comprising a link power-state change condition and being determined as a function of utilization of the link; and
effecting a change in the power-state for the link by effecting a change in the power state of first and second ports of respective first and second network elements linked in communication via the link.

27. A tangible non-transitory machine readable medium of claim 26, wherein effecting a change in the power state for a link comprises taking the link offline by effecting powering off network interfaces corresponding to the first and second ports.

28. A tangible non-transitory machine readable medium of claim 26, wherein effecting a change in the power state for a link comprises effecting a reduction of a power state to an idle state for each of the first and second ports.

29. A tangible non-transitory machine readable medium of claim 26, wherein execution of the instructions cause the apparatus to perform further operation comprising identifying links among the plurality of links that are candidates for power management as a function of longer term link utilization, wherein the longer term link utilization is measured over an extended time period.

30. A tangible non-transitory machine readable medium of claim 26, wherein determining the network link topology and identifying links that are candidates for power management comprises: identifying nodes and links connecting the nodes; determining a utilization of the links; determining a most utilized link spanning tree for the network link topology; and
identifying links that are not links in the most utilized link spanning tree as candidates for power management.

* * * * *